(12) United States Patent
Koo et al.

(10) Patent No.: US 11,689,744 B2
(45) Date of Patent: Jun. 27, 2023

(54) METHODS AND APPARATUSES FOR PROCESSING VIDEO SIGNAL

(71) Applicant: LG ELECTRONICS INC., Seoul (KR)

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/258,973

(22) PCT Filed: Jul. 8, 2019

(86) PCT No.: PCT/KR2019/008336
§ 371 (c)(1),
(2) Date: Jan. 8, 2021

(87) PCT Pub. No.: WO2020/013541
PCT Pub. Date: Jan. 16, 2020

(65) Prior Publication Data
US 2021/0321134 A1    Oct. 14, 2021

Related U.S. Application Data

(60) Provisional application No. 62/697,388, filed on Jul. 12, 2018.

(51) Int. Cl.
*H04N 11/02* (2006.01)
*H04N 19/61* (2014.01)
(Continued)

(52) U.S. Cl.
CPC .......... *H04N 19/61* (2014.11); *H04N 19/124* (2014.11); *H04N 19/176* (2014.11); *H04N 19/18* (2014.11); *H04N 19/91* (2014.11)

(58) Field of Classification Search
CPC .... H04N 19/61; H04N 19/124; H04N 19/176; H04N 19/18; H04N 19/91
(Continued)

(56) References Cited

U.S. PATENT DOCUMENTS 10,681,379 B2 *    6/2020  Zhao ................... H04N 1/32181
2013/0094584 A1 *  4/2013  Kondo .................... H04N 19/42
375/240.18
(Continued)

FOREIGN PATENT DOCUMENTS

KR    10-2013-0098360 A    9/2013
KR       10-1529650 B1    6/2015
(Continued)

OTHER PUBLICATIONS

Moonmo Koo, et al., "CE 6.2.5: Layered Givens Transform (LGT)", JVET-K0098, Joint Video Experts Team (JVET) of ITU-T SG 16 WP 3 and ISO/IEC JTC 1/SC 29/WG 11, 11th Meeting: Ljubljana, SI, Jul. 10-18, 2018.
(Continued)

*Primary Examiner* — Jayanti K Patel
*Assistant Examiner* — Richard B Carter
(74) *Attorney, Agent, or Firm* — Dentons US LLP

(57) ABSTRACT

Embodiments of the present invention provide video signal processing methods. A video signal encoding method according to an embodiment of the present invention comprises checking a transform block including residual samples except a prediction sample from a picture of the video signal, generating transform coefficients through a transform for the residual samples of the transform block based on a size of the transform block, and performing quantization and entropy coding the transform coefficients, wherein generating the transform coefficients includes, applying a forward primary transform to each of a horizontal
(Continued)

direction and vertical direction of the transform block including the residual samples, and not applying a forward non-separable secondary transform to the transform block to which the primary transform has been applied when the size of the transform block is smaller than or equal to 4×4, and applying the forward non-separable secondary transform to the transform block when the size of the transform block is greater than 4×4.

9 Claims, 31 Drawing Sheets

(51) Int. Cl.
    *H04N 19/124*     (2014.01)
    *H04N 19/176*     (2014.01)
    *H04N 19/18*     (2014.01)
    *H04N 19/91*     (2014.01)

(58) Field of Classification Search
    USPC .................................................. 375/240.12
    See application file for complete search history.

(56) References Cited

U.S. PATENT DOCUMENTS

| | | | |
|---|---|---|---|
| 2017/0094313 A1* | 3/2017 | Zhao | H04N 19/176 |
| 2018/0103252 A1* | 4/2018 | Hsieh | H04N 19/176 |
| 2020/0280737 A1* | 9/2020 | Ikai | H04N 19/12 |

FOREIGN PATENT DOCUMENTS

| | | |
|---|---|---|
| WO | 18/044125 A1 | 3/2018 |
| WO | 18044125 A1 | 3/2018 |

OTHER PUBLICATIONS

JVET-K0099-ver3: Salehifar et al., "CE 6.2.6: Reduced Secondary Transform (RST)," Joint Video Experts Team (JVET) of ITU-T SG 16 WP 3 and ISO/IEC JTC 1/SC 29/WG 11, LG Electronics Inc. 11th Meeting: Ljubljana, SI, Jul. 10-18, 2018 (12 Pages).

Zhao et al., "Enhanced Multiple Transform for Video Coding," 2016 data Compression Conference, Qualcomm Technologies, Inc. (10 Pages).

* cited by examiner

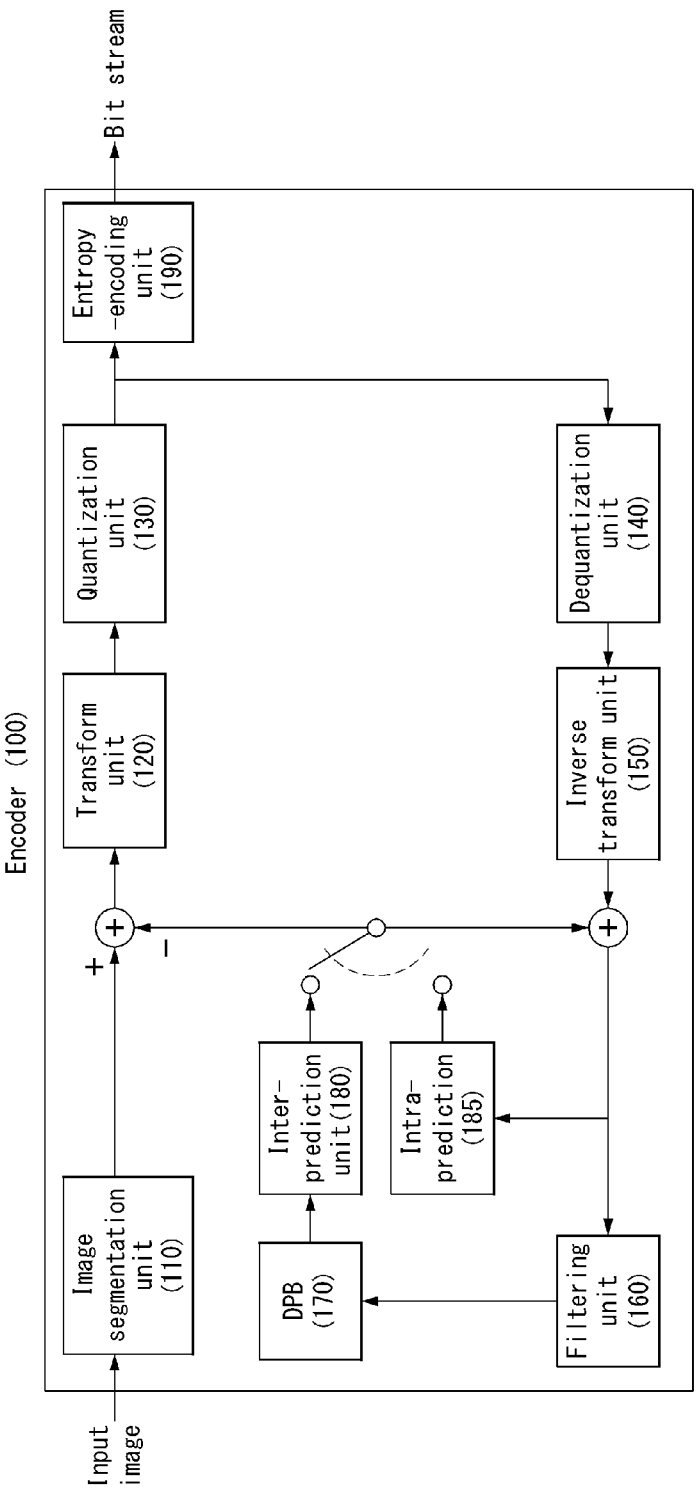
[FIG. 1]

[FIG. 2]
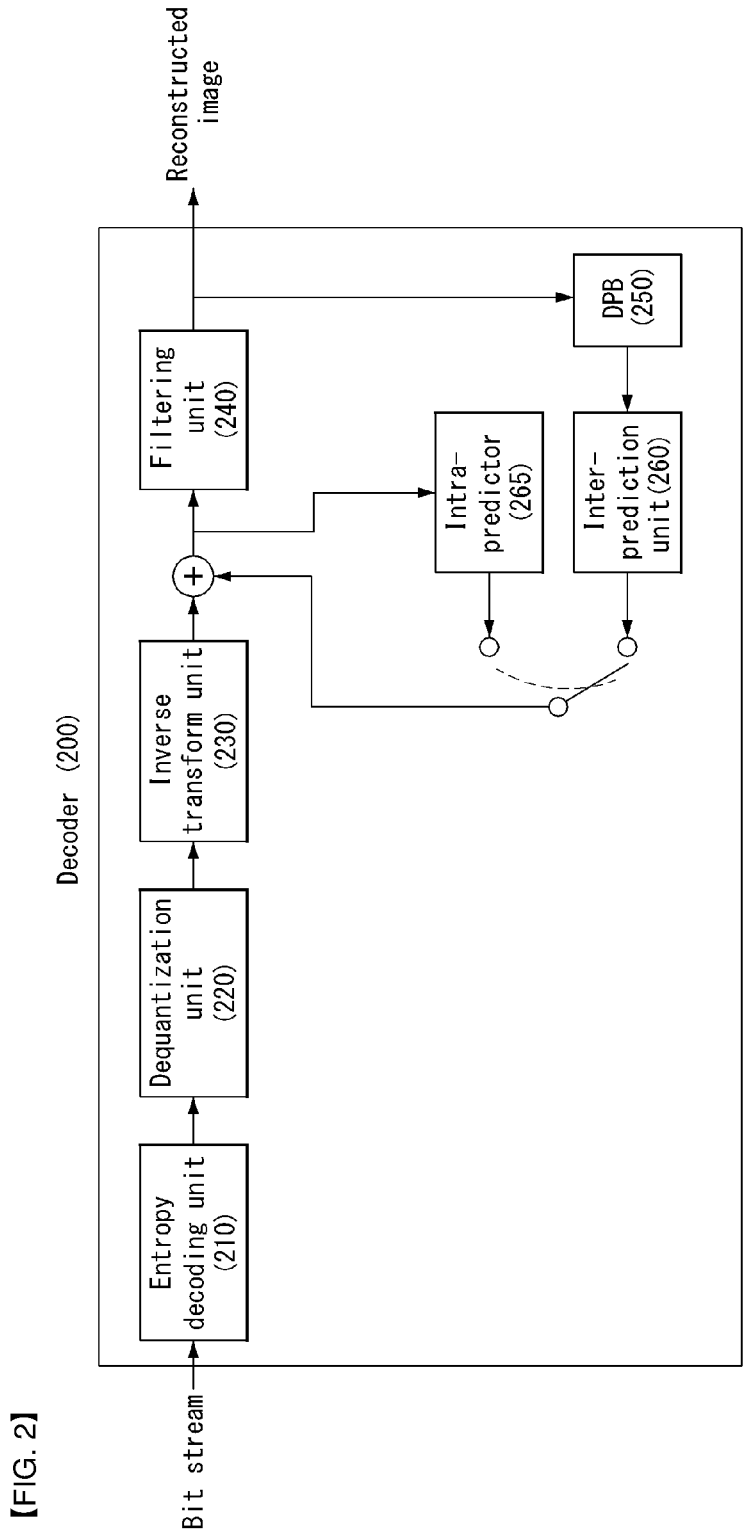

【FIG. 3a】
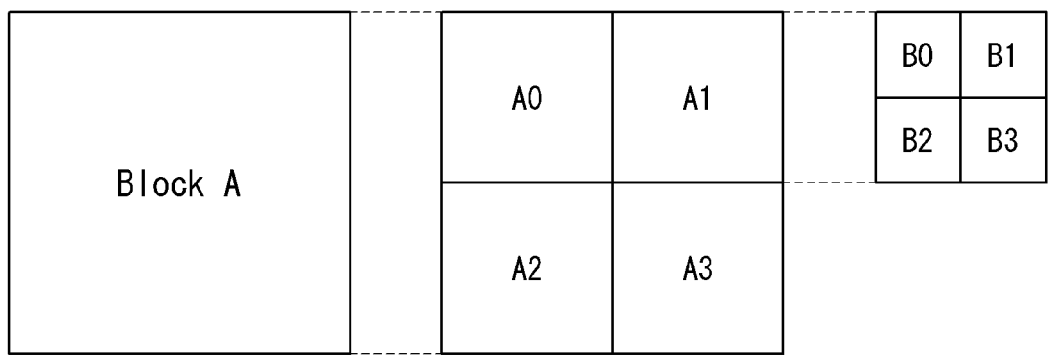
【FIG. 3b】
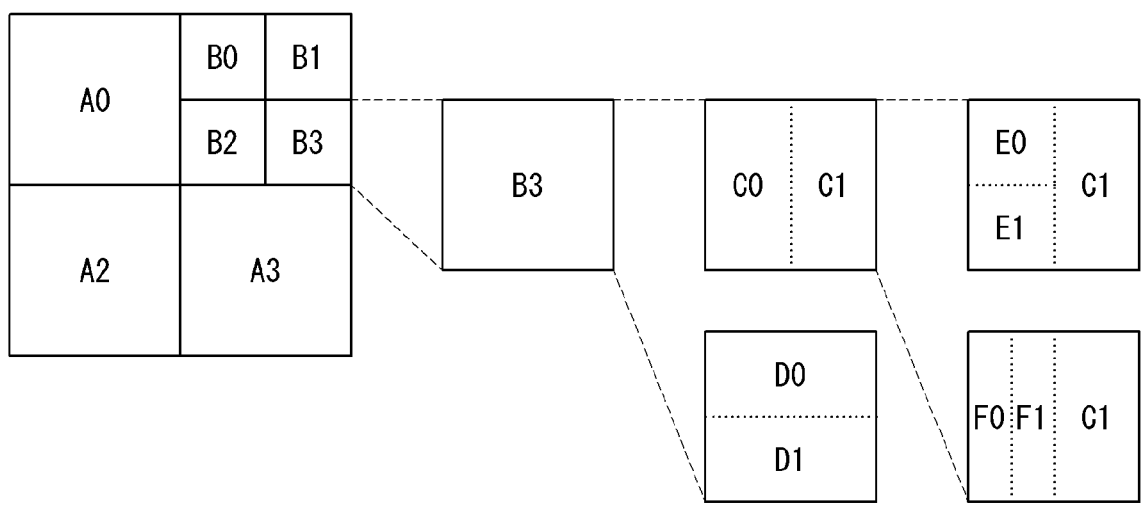

[FIG. 3c]
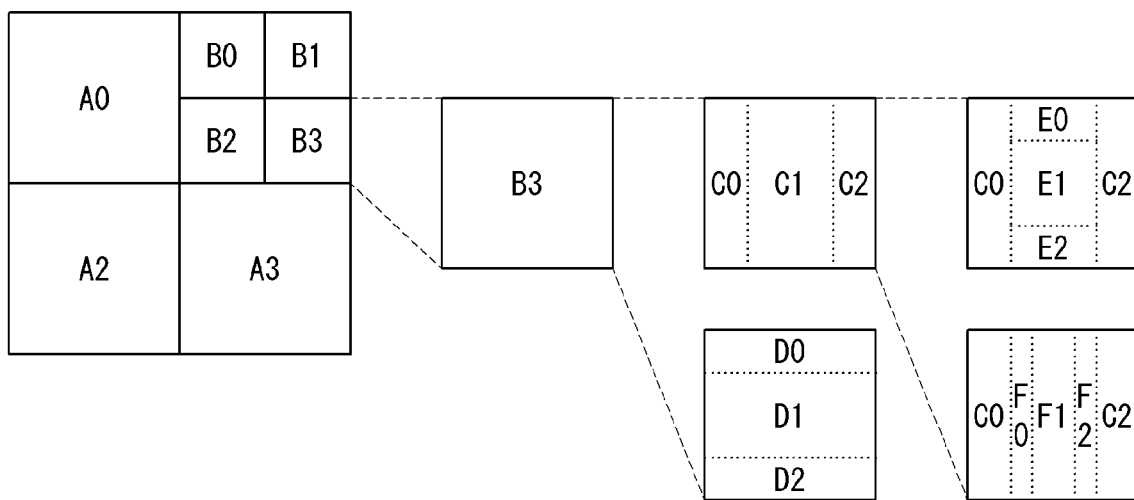
[FIG. 3d]
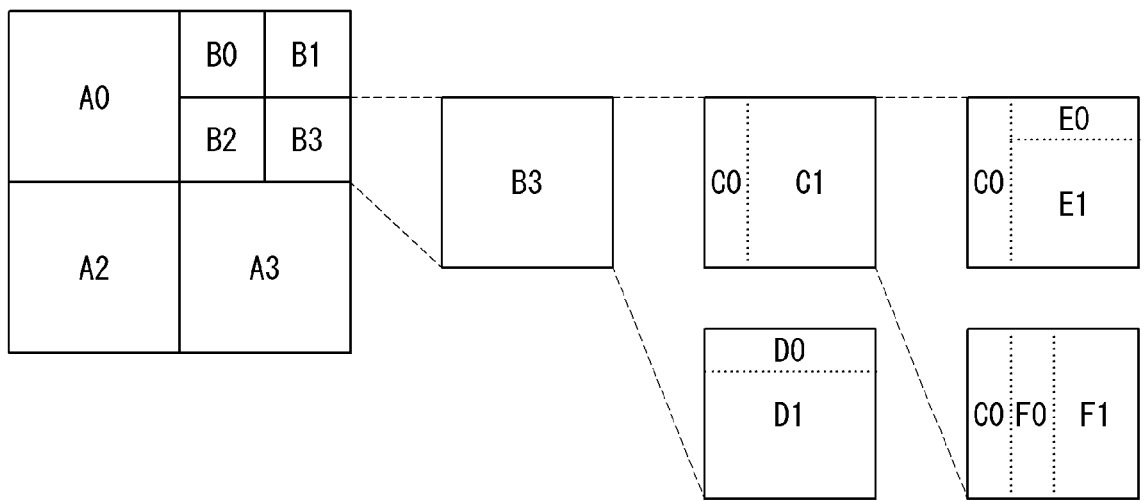

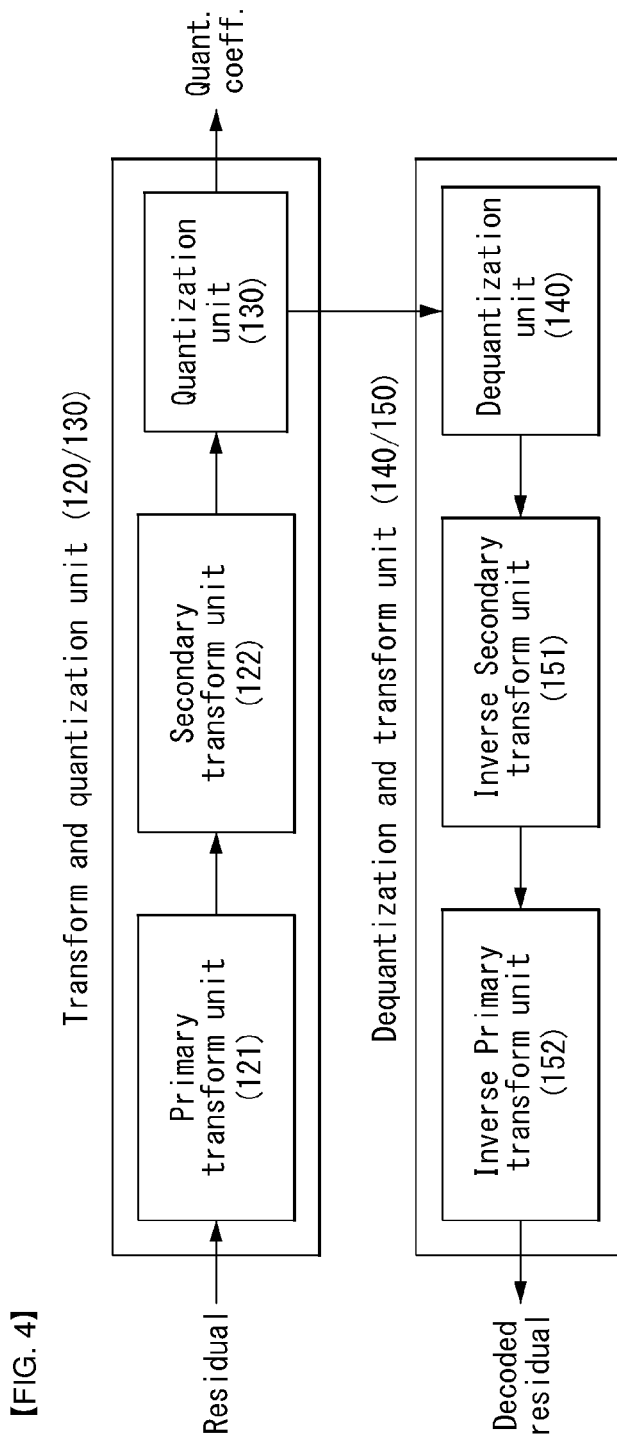
[FIG. 4]

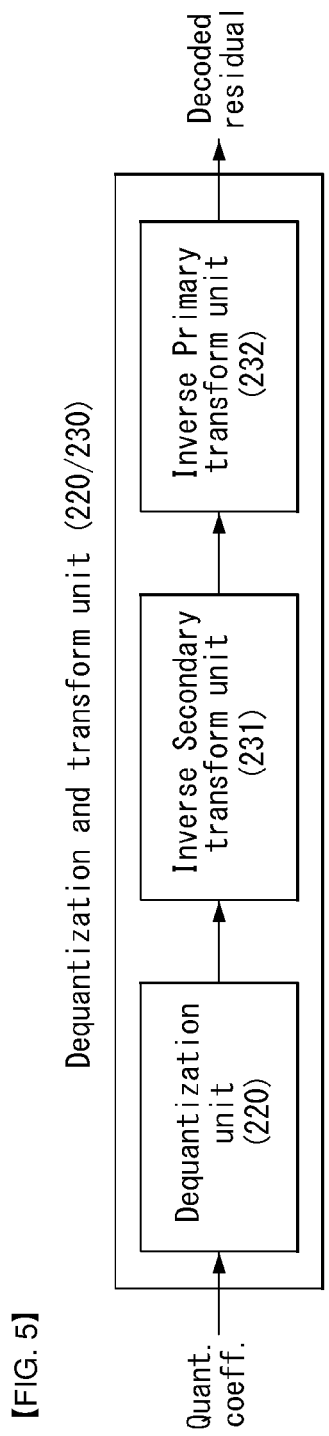
[FIG. 5]

[FIG. 6a]

| Set | Index | Hor. | Ver. | Intra Pred mode |
|---|---|---|---|---|
| Set 0 | 0 | DST-7 | DST-7 | 0 |
| | 1 | DCT-5 | DST-7 | |
| | 2 | DST-7 | DCT-5 | |
| | 3 | DCT-5 | DCT-5 | |
| Set 1 | 0 | DST-7 | DST-7 | 1, 3, 5, 7, 9, 11, 13, 23, 25, 27, 29, 31, 33, 35, 37, 39, 41, 43, 45, 55, 57, 59, 61, 63, 65 |
| | 1 | DST-1 | DST-7 | |
| | 2 | DST-7 | DST-1 | |
| | 3 | DST-1 | DST-1 | |
| Set 2 | 0 | DST-7 | DST-7 | 2, 4, 6, 8, 10, 12, 24, 26, 28, 30, 32, 34, 36, 38, 40, 42, 44, 56, 58, 60, 64, 66 |
| | 1 | DCT-8 | DST-7 | |
| | 2 | DST-7 | DCT-8 | |
| | 3 | DCT-8 | DCT-8 | |
| Set 3 | 0 | DST-7 | DST-7 | 14, 15, 16, 17, 18, 19, 20, 21, 22 (Neighboring angles to horizontal directions) |
| | 1 | DCT-5 | DST-7 | |
| | 2 | DST-7 | DCT-8 | |
| | 3 | DCT-5 | DCT-8 | |
| Set 4 | 0 | DST-7 | DST-7 | 46, 47, 48, 49, 50, 51, 52, 53, 54 (Neighboring angles to vertical directions) |
| | 1 | DCT-8 | DST-7 | |
| | 2 | DST-7 | DCT-5 | |
| | 3 | DCT-8 | DCT-5 | |

【FIG. 6b】

|  | Idx. | Hor. | Ver. |
|---|---|---|---|
| MTS_CU_Flag = 0 | N/A | DCT-2 | DCT-2 |
| MTS_CU_Flag = 1 | 0 | DCT-8 | DCT-8 |
|  | 1 | DST-7 | DCT-8 |
|  | 2 | DCT-8 | DST-7 |
|  | 3 | DST-7 | DST-7 |

[FIG. 7]
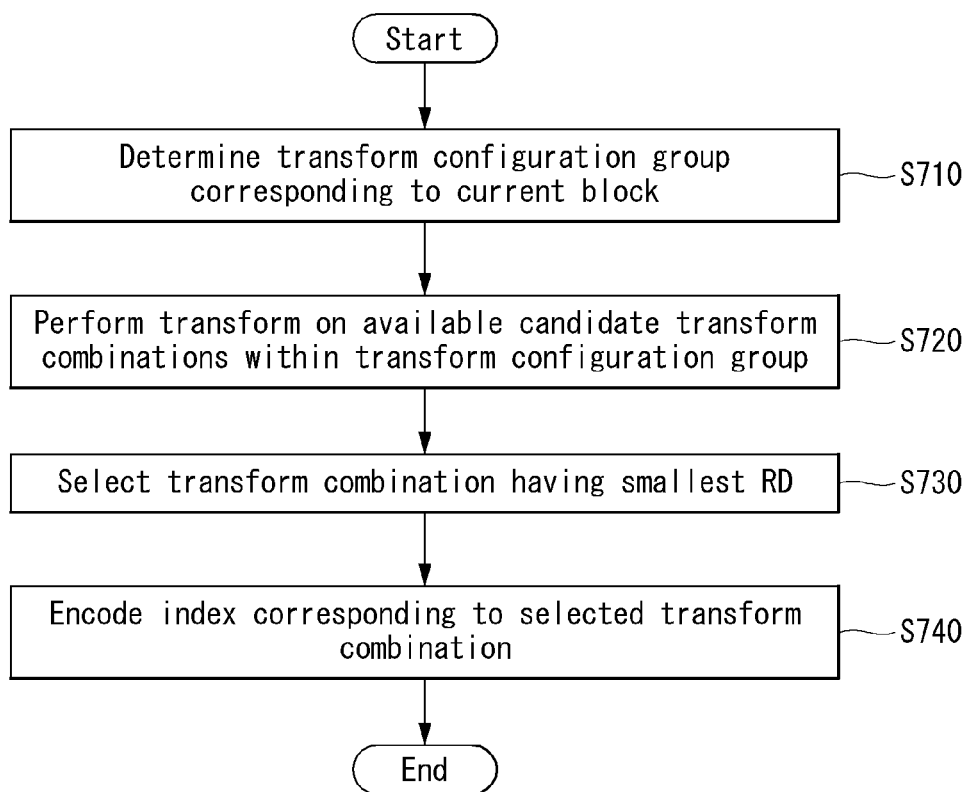

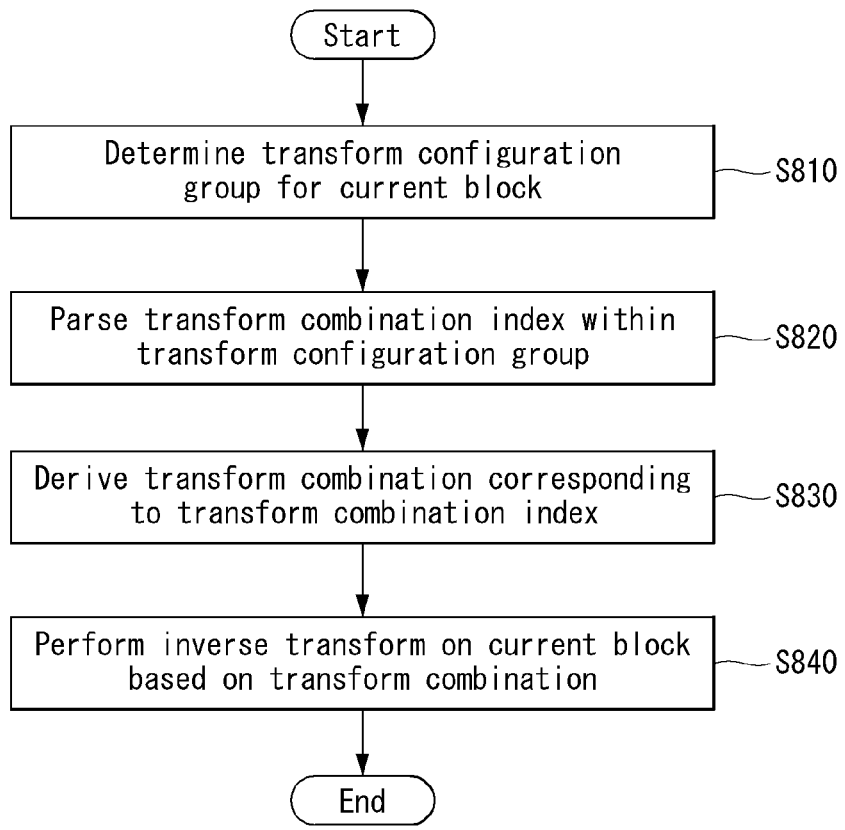
[FIG. 8]

[FIG. 9]
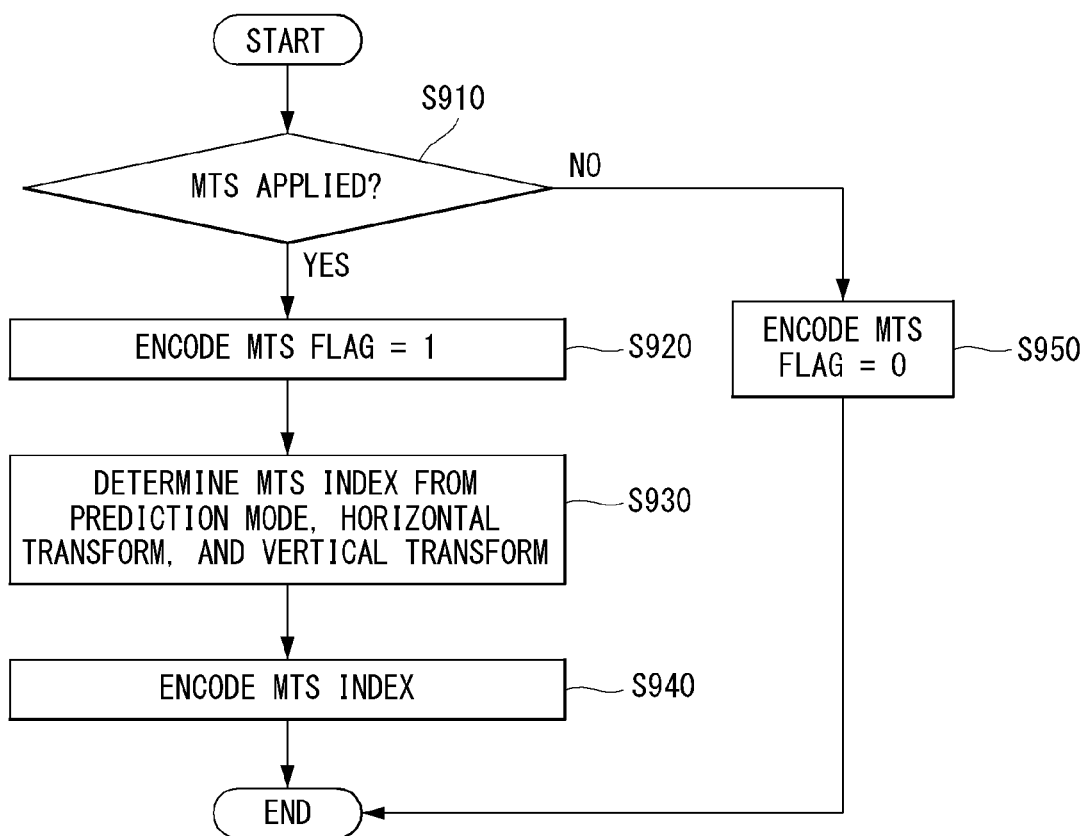

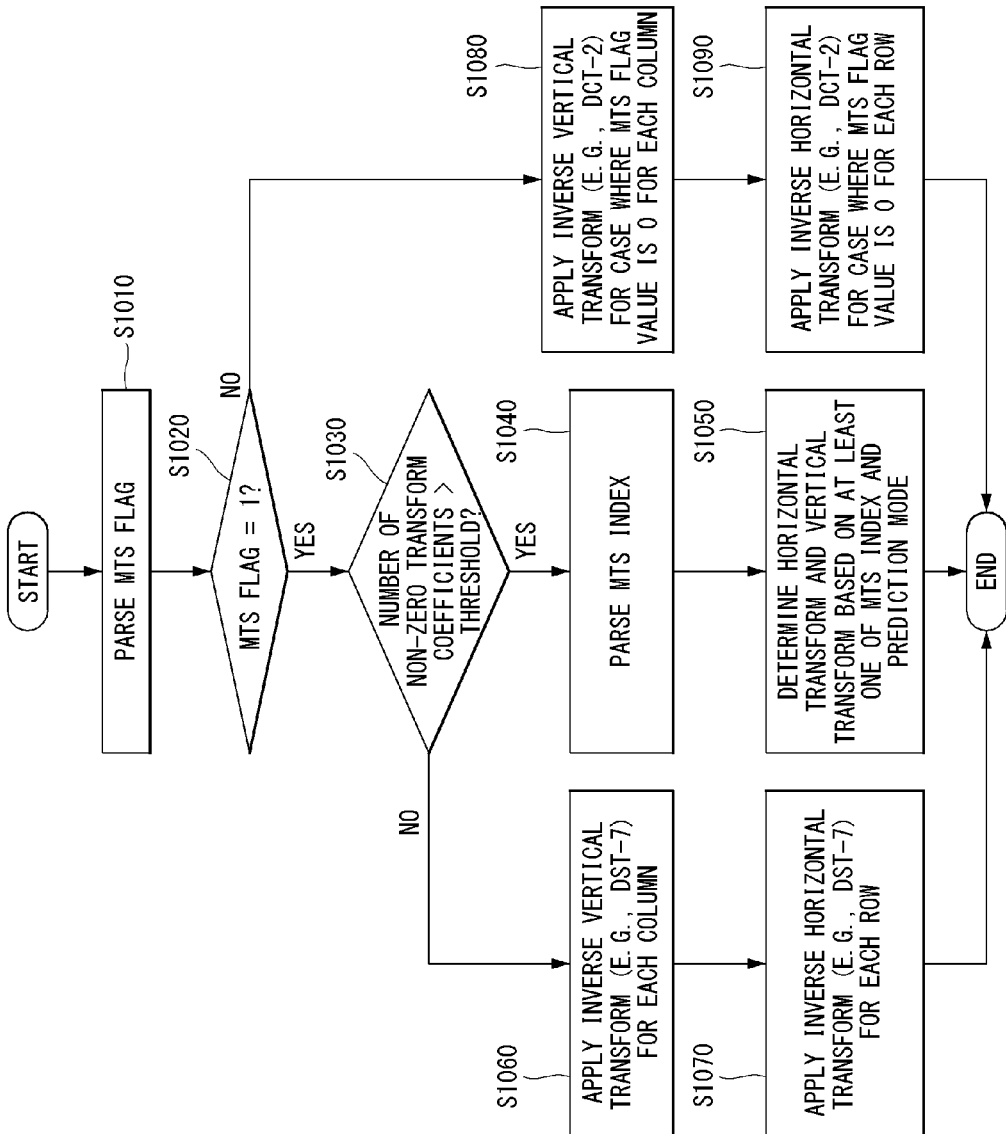
[FIG. 10]

[FIG. 11]
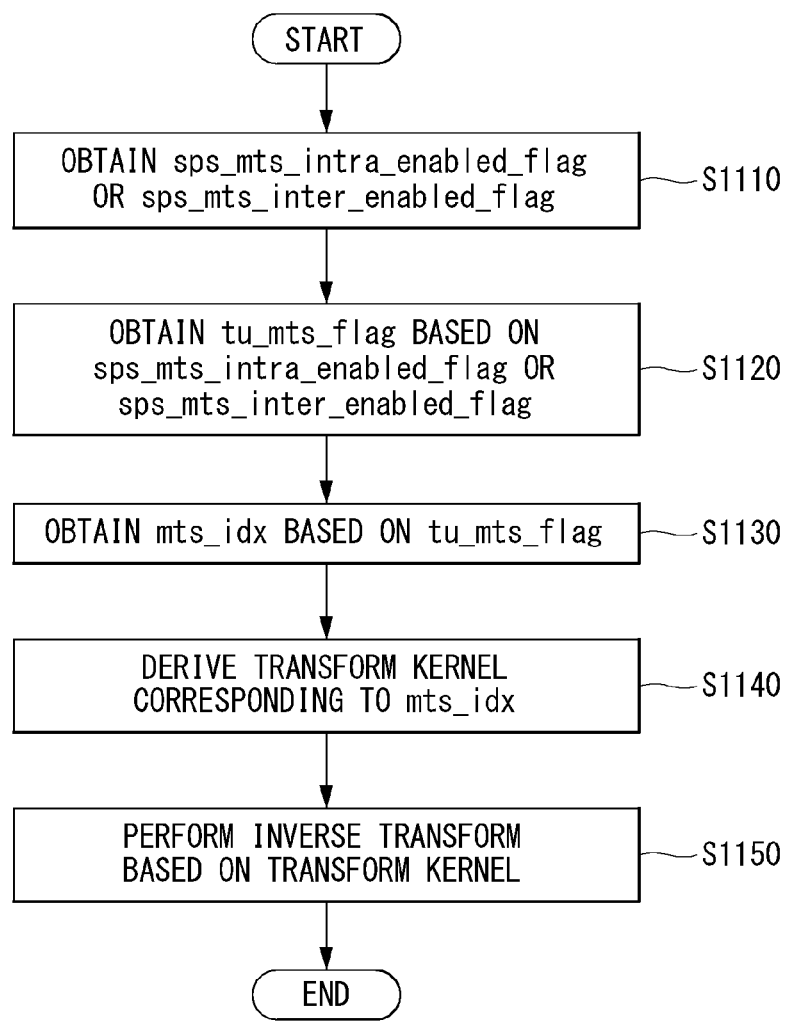

[FIG. 12]

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 55 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

[FIG. 13]
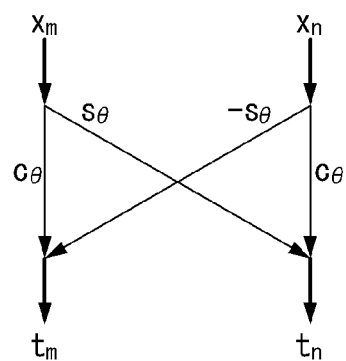

[FIG. 14]
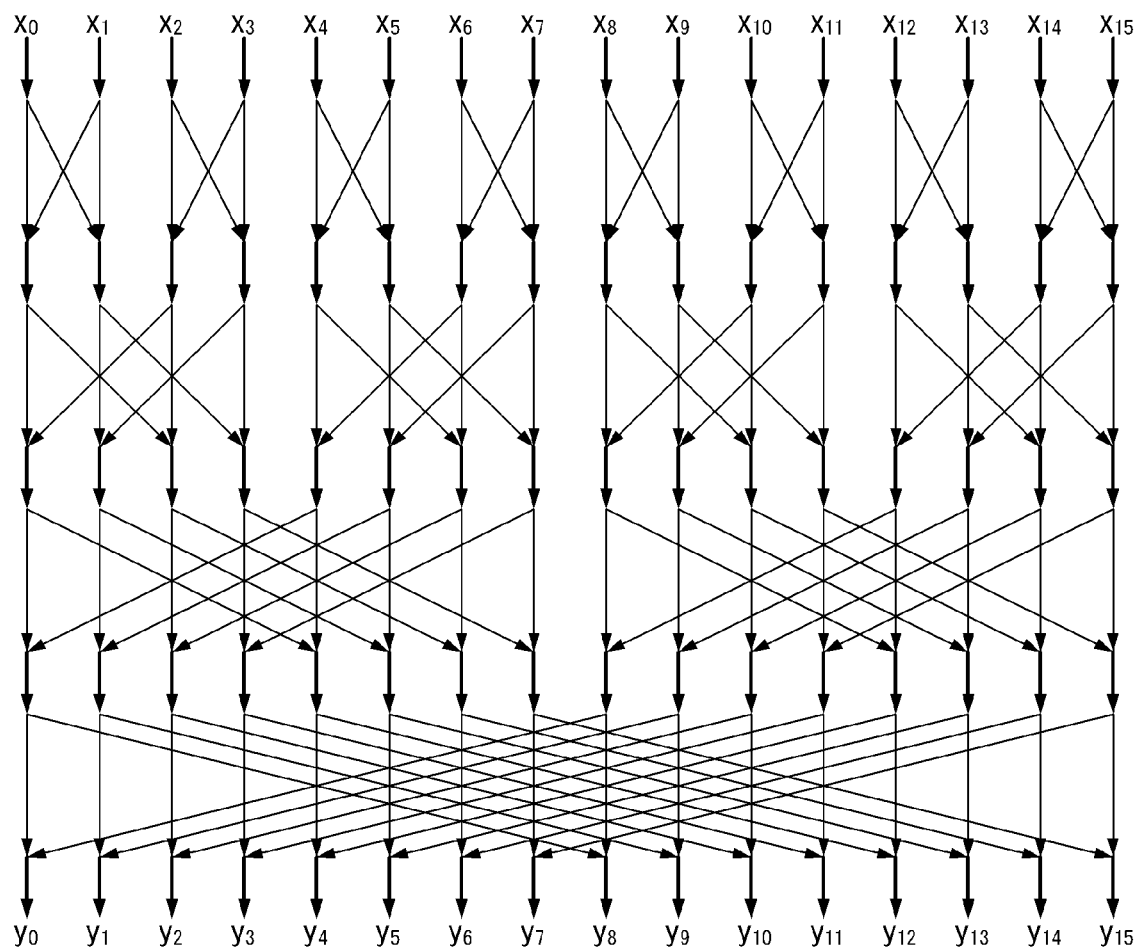

[FIG. 15]
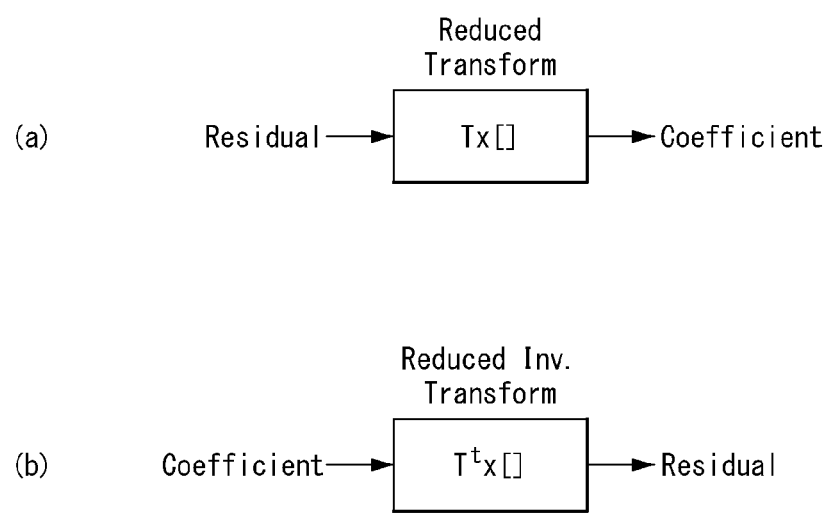

[FIG. 16]
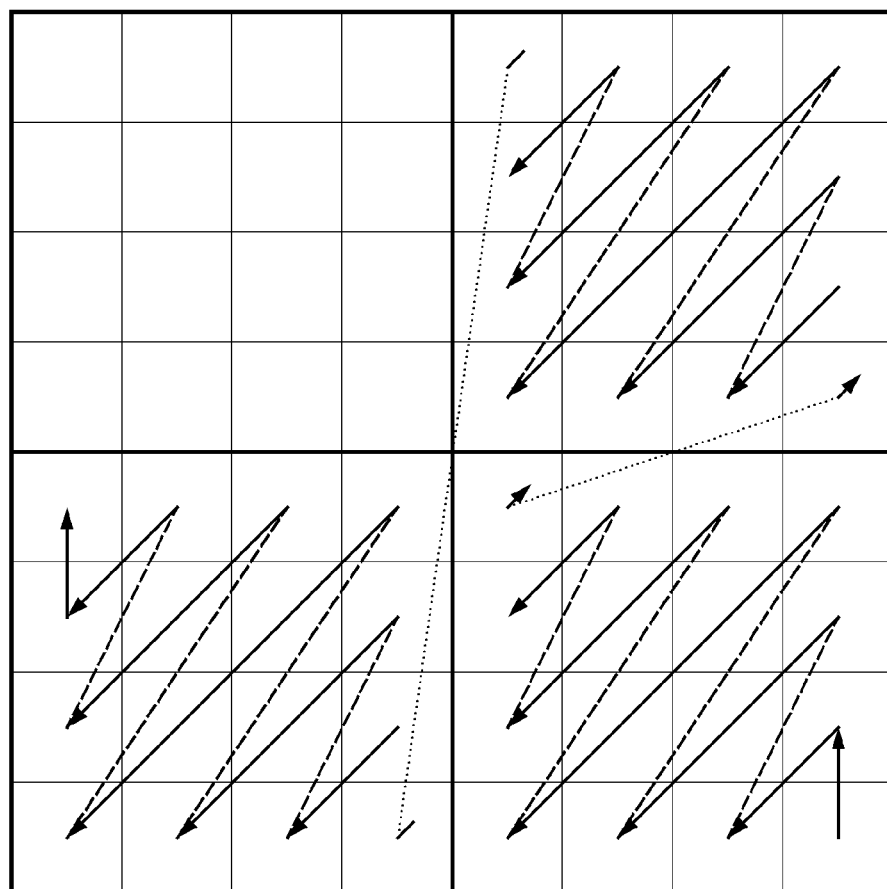

【FIG. 17】

| 1 | 3 | 6 | 10 |
|---|---|---|----|
| 2 | 5 | 9 | 13 |
| 4 | 8 | 12 | 15 |
| 7 | 11 | 14 | 16 |

(a)

| 1 | 2 | 3 | 4 |
|---|---|---|---|
| 5 | 6 | 7 | 8 |
| 9 | 10 | 11 | 12 |
| 13 | 14 | 15 | 16 |

(b)

| 1 | 5 | 9 | 13 |
|---|---|---|----|
| 2 | 6 | 10 | 14 |
| 3 | 7 | 11 | 15 |
| 4 | 8 | 12 | 16 |

【FIG. 19】
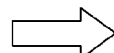
(a)  (b)

[FIG. 20]
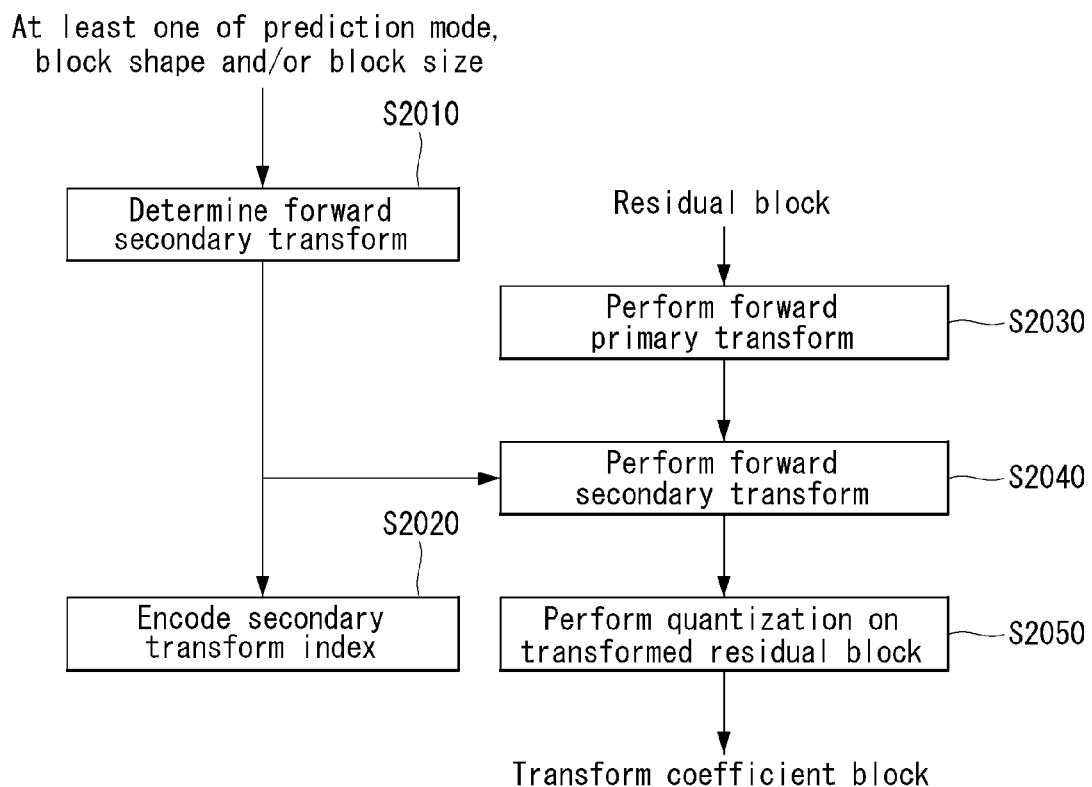

[FIG. 21]
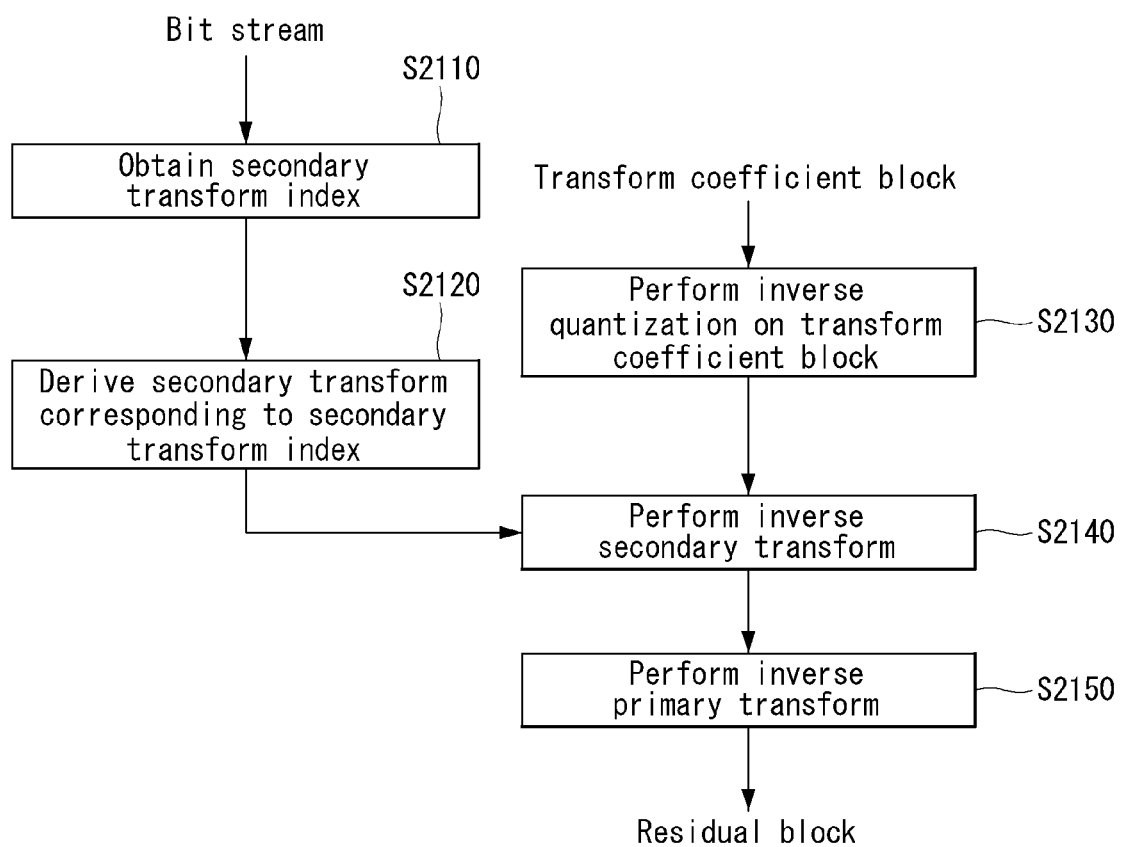

[FIG. 22]
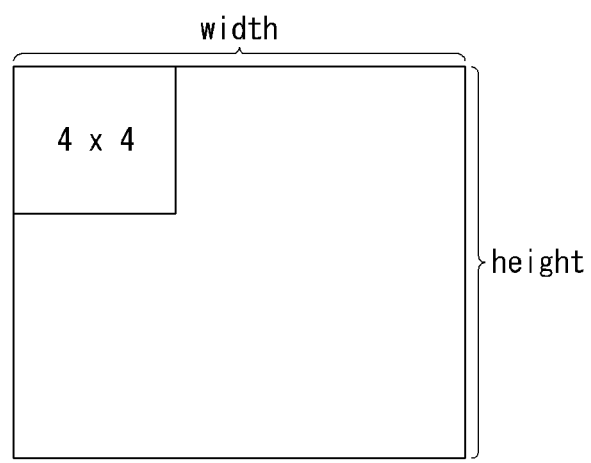

[FIG. 23a]

| MTS index | Hor. transform | Ver. Transform |
|---|---|---|
| 0 | DST-7 | DST-7 |
| 1 | DCT-8 | DST-7 |
| 2 | DST-7 | DCT-8 |
| 3 | DCT-8 | DCT-8 |

[FIG. 23b]

| MTS index | Hor. transform | Ver. Transform |
|---|---|---|
| 0 | DCT-8 | DCT-8 |
| 1 | DST-7 | DCT-8 |
| 2 | DCT-8 | DST-7 |
| 3 | DST-7 | DST-7 |

[FIG. 24]
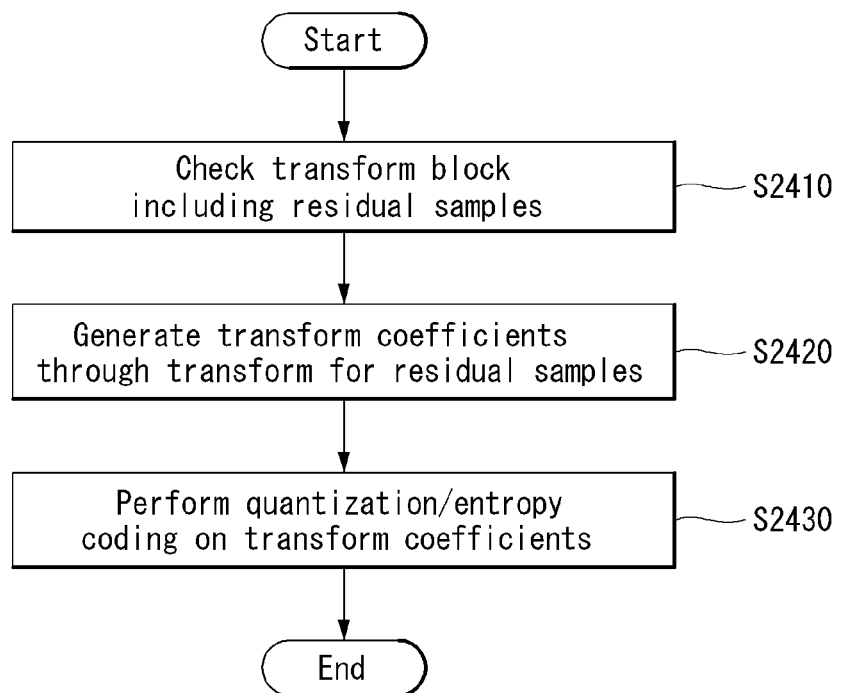

[FIG. 25]
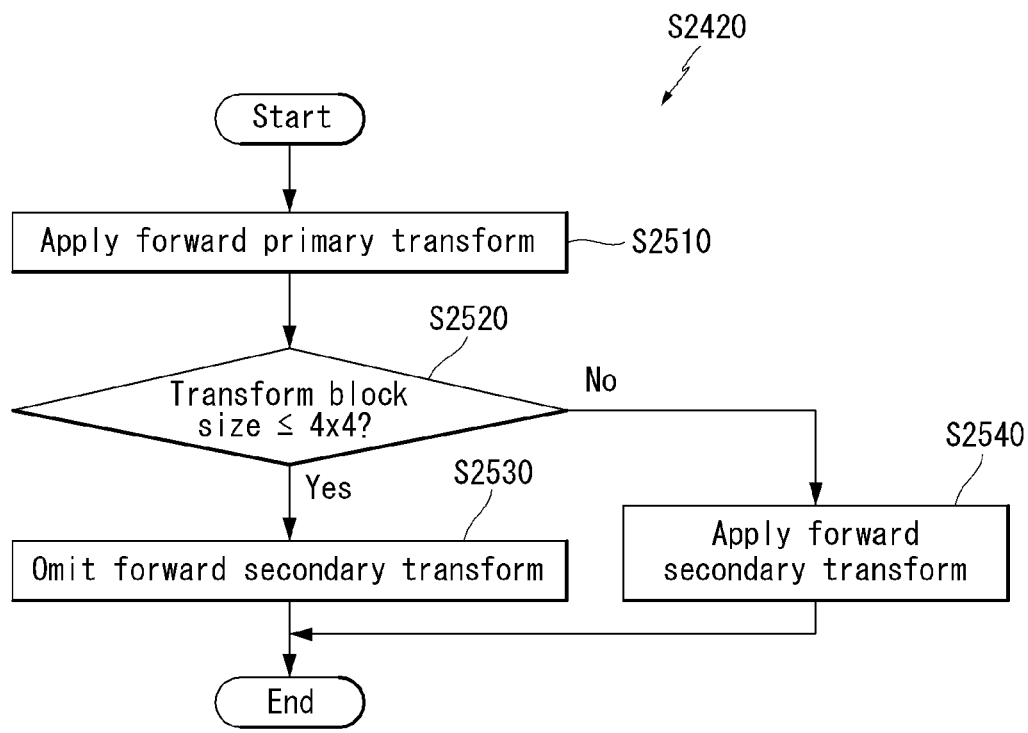

[FIG. 26]
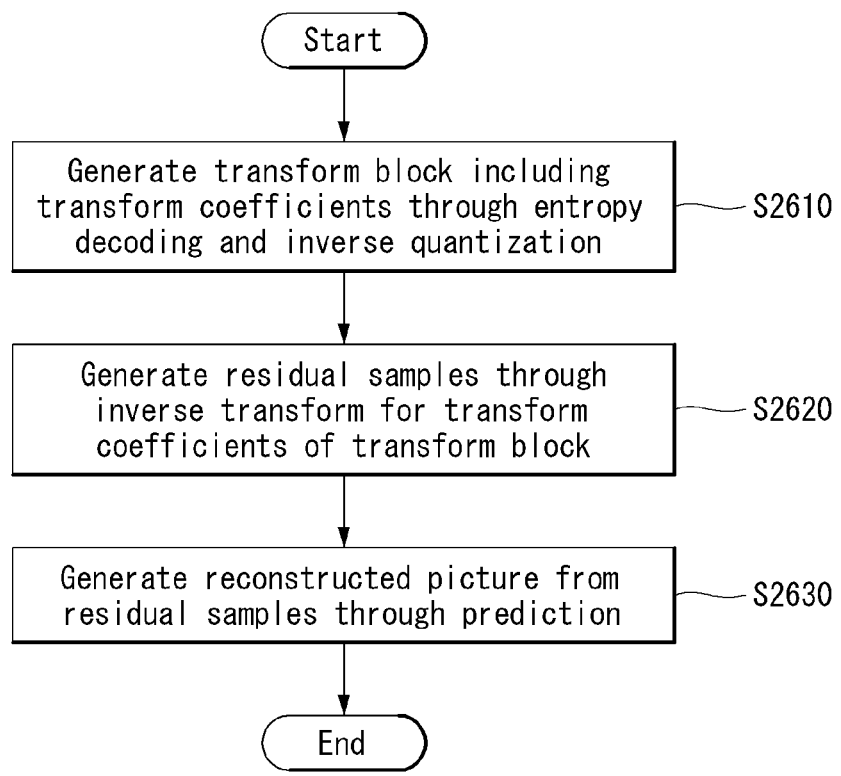

[FIG. 27]
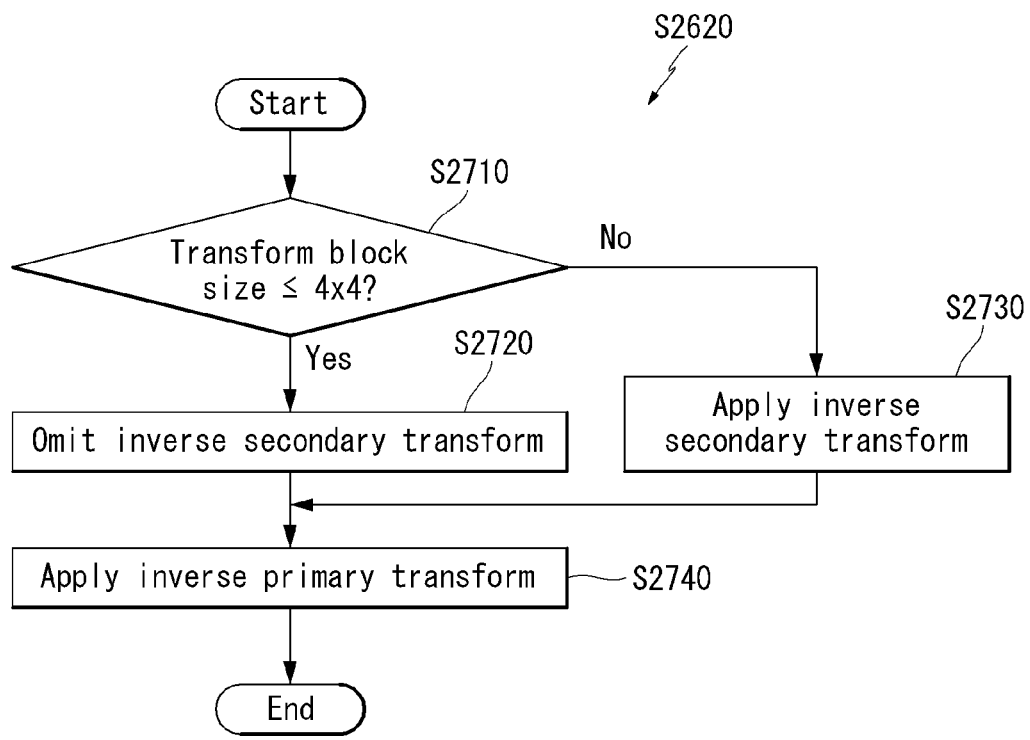

[FIG. 28]
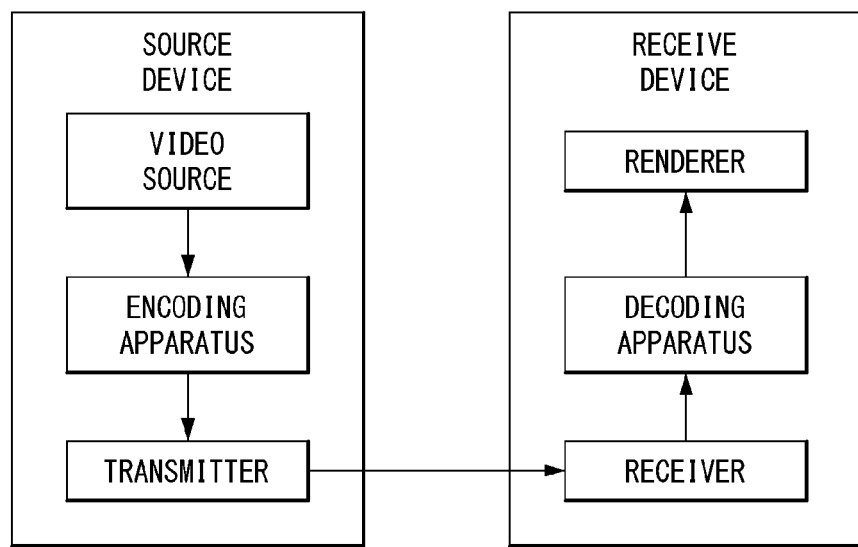

[FIG. 29]
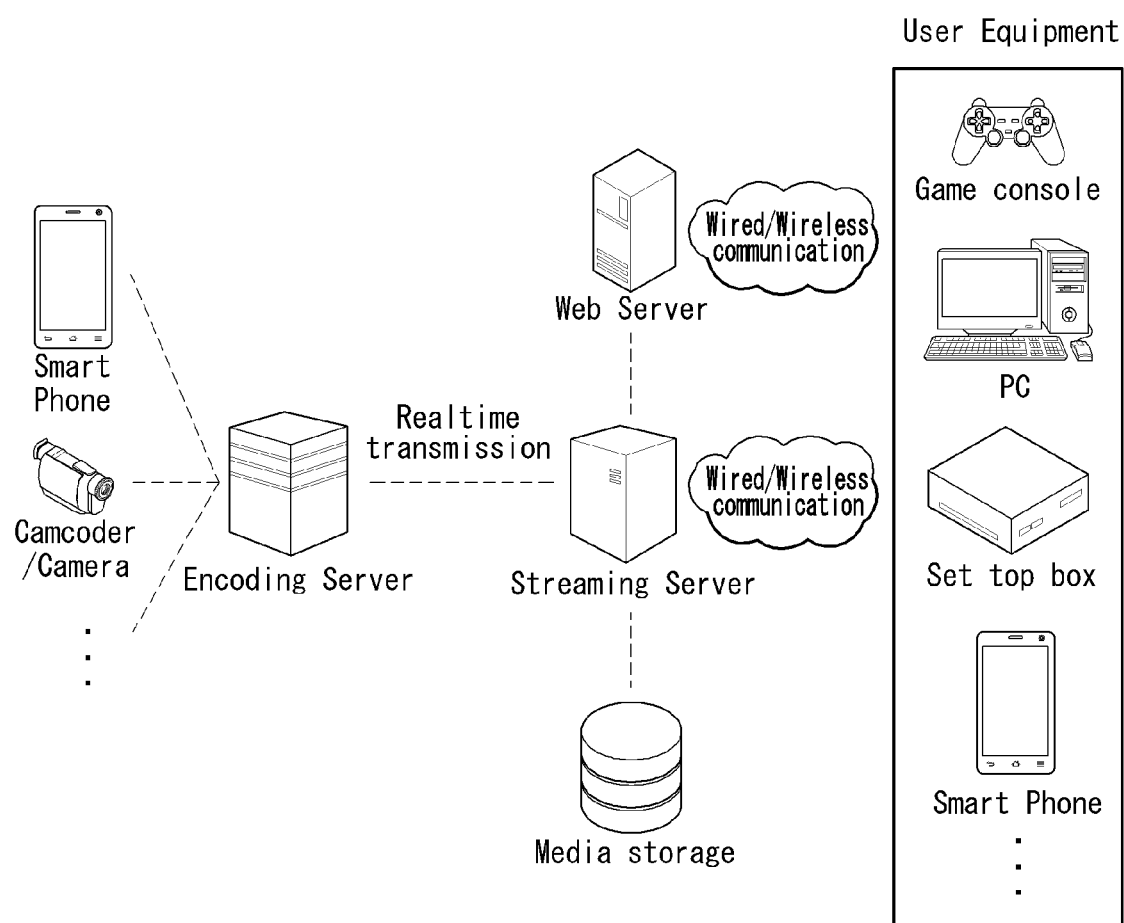

METHODS AND APPARATUSES FOR PROCESSING VIDEO SIGNAL

CROSS-REFERENCE TO RELATED APPLICATIONS

This application is the National Stage filing under 35 U.S.C. 371 of International Application No. PCT/KR2019/008336, filed on Jul. 8, 2019, which claims the benefit of U.S. Provisional Application No. 62/697,388, filed on Jul. 12, 2018, the contents of which are all hereby incorporated by reference herein in their entirety.

TECHNICAL FIELD

The present disclosure relates to a method and apparatus for processing a video signal and, more particularly, to a method and apparatus for encoding and decoding a video signal by omitting the application of a non-separable secondary transform to a transform block having a 4×4 size.

BACKGROUND ART

Compression encoding means a series of signal processing techniques for transmitting digitized information through a communication line or techniques for storing the information in the form that is suitable for a storage medium. The media including a video, an image, an audio, and the like may be the target for the compression encoding, and particularly, the technique of performing the compression encoding targeted to the video is referred to as a video image compression.

Next generation video content is supposed to have the characteristics of high spatial resolution, high frame rate and high dimensionality of scene representation. In order to process such contents, drastic increase of memory storage, memory access rate and processing power will be resulted.

Accordingly, a coding tool for processing more efficiently the next generation video contents needs to be designed. In particular, video codec standard after high efficiency video coding (HEVC) standard requires an efficient transform technology for transforming a video signal of a spatial domain into a frequency domain.

DISCLOSURE

Technical Problem

For an implementation of an efficient transform technology, there is a need for a method and apparatus for providing a low-complexity transform technology.

Accordingly, embodiments of the present disclosure provide a video signal processing method and apparatus for performing a transform with low complexity.

Furthermore, embodiments of the present disclosure provide a video signal processing method and apparatus capable of reducing computational complexity through a non-separable secondary transform.

The technical objects to be achieved by the present disclosure are not limited to those that have been described hereinabove merely by way of example, and other technical objects that are not mentioned can be clearly understood from the following descriptions by those skilled in the art to which the present disclosure pertains.

Technical Solution

A method of encoding a video signal according to an embodiment of the present disclosure includes checking a transform block including residual samples except a prediction sample from a picture of the video signal, generating transform coefficients through a transform for the residual samples of the transform block based on a size of the transform block, and performing quantization and entropy coding the transform coefficients. Generating the transform coefficients may include applying a forward primary transform to each of a horizontal direction and vertical direction of the transform block including the residual samples, and omitting the application of a forward non-separable secondary transform to the transform block to which the primary transform has been applied when the size of the transform block is smaller than or equal to 4×4 and applying the forward non-separable secondary transform to the transform block when the size of the transform block is greater than 4×4.

According to an embodiment of the present disclosure, applying the forward non-separable secondary transform to the transform block may include applying the forward non-separable secondary transform to a left-top 4×4 region of the transform block.

Furthermore, the forward non-separable secondary transform according to an embodiment of the present disclosure may include at least one of a reduced secondary transform (RST) having an L×16 matrix, wherein L is smaller than or equal to 16, a sparse orthonormal transform (SOT) having a matrix of a 16×16 form, a Givens rotation-based transform having 16 inputs and 16 outputs, or a layered givens transform having 16 inputs and 16 outputs and applying a designated permutation between two neighboring Givens rotation layers.

Furthermore, the forward primary transform may include a horizontal transform and a vertical transform for the transform block, and each of the horizontal transform and the vertical transform may be configured by a combination of DCT-2, DST-7 or DCT-8.

A method of decoding a video signal according to an embodiment of the present disclosure includes generating a transform block including transform coefficients by performing entropy decoding and inverse quantization on the video signal, generating residual signals through an inverse transform for the transform coefficients of the transform block based on a size of the transform block, and generating a reconstructed picture by generating a prediction signal through prediction from the residual signals. Performing the inverse quantization may include omitting the application of an inverse non-separable secondary transform to the transform block when the size of the transform block is smaller than or equal to 4×4 and applying the inverse non-separable secondary transform to the transform block when the size of the transform block is greater than 4×4, and applying an inverse primary transform to the transform block separately in a horizontal direction and a vertical direction.

According to an embodiment of the present disclosure, applying the inverse non-separable secondary transform to the transform block may include applying the inverse non-separable secondary transform to a left-top 4×4 region of the transform block.

The inverse non-separable secondary transform according to an embodiment of the present disclosure includes at least one of a reduced secondary transform (RST) having a matrix of an L×16 form, wherein L is smaller than or equal to 16, a sparse orthonormal transform (SOT) having a matrix of a 16×16 form, a Givens rotation-based transform having 16 inputs and 16 outputs, or a layered givens transform having 16 inputs and 16 outputs and applying a designated permutation between two neighboring Givens rotation layers. The inverse primary transform may include a horizontal transform and a vertical transform for the transform block, and the horizontal transform and the vertical transform may be configured by a combination of DCT-2, DST-7, and DCT-8.

An apparatus for encoding a video signal according to an embodiment of the present disclosure may include a memory storing the video signal and an encoder functionally coupled to the memory and configured to encoding-process the video signal. The encoder may be configured to check a transform block including residual samples except a prediction sample from a picture of the video signal, generate transform coefficients through a transform for the residual samples of the transform block based on a size of the transform block, and perform quantization and entropy coding the transform coefficients When generating the transform coefficients through the transform for the residual samples of the transform block, the encoder may be configured to apply a forward primary transform to each of a horizontal direction and vertical direction of the transform block including the residual samples, omit the application of a forward non-separable secondary transform to the transform block to which the primary transform has been applied when the size of the transform block is smaller than or equal to 4×4, and apply the forward non-separable secondary transform to the transform block when the size of the transform block is greater than 4×4.

The encoder according to an embodiment of the present disclosure may be configured to apply the forward non-separable secondary transform to a left-top 4×4 region of the transform block when the size of the transform block is greater than 4×4.

The forward non-separable secondary transform according to an embodiment of the present disclosure may include at least one of a reduced secondary transform (RST) having an L×16 matrix, wherein L is smaller than or equal to 16, a sparse orthonormal transform (SOT) having a matrix of a 16×16 form, a Givens rotation-based transform having 16 inputs and 16 outputs, or a layered givens transform having 16 inputs and 16 outputs and applying a designated permutation between two neighboring Givens rotation layers.

The forward primary transform according to an embodiment of the present disclosure may include a horizontal transform and a vertical transform for the transform block, and each of the horizontal transform and the vertical transform may be configured by a combination of DCT-2, DST-7 or DCT-8.

An apparatus for decoding a video signal according to an embodiment of the present disclosure may include a memory storing the video signal and a decoder functionally coupled to the memory and configured to decoding-process the video signal. The decoder may be configured to generate a transform block including transform coefficients by performing entropy decoding and inverse quantization on the video signal, generate residual signals through an inverse transform for the transform coefficients of the transform block based on a size of the transform block, and generate a reconstructed picture by generating a prediction signal through prediction from the residual signals. When generating the residual signals through the inverse transform for the transform coefficients of the transform block, the decoder may be configured to omit the application of an inverse non-separable secondary transform to the transform block when the size of the transform block is smaller than or equal to 4×4, apply the inverse non-separable secondary transform to the transform block when the size of the transform block is greater than 4×4, and apply an inverse primary transform to the transform block separately in a horizontal direction and a vertical direction.

The decoder according to an embodiment of the present disclosure may be configured to apply the inverse non-separable secondary transform to a left-top 4×4 region of the transform block when the size of the transform block is greater than 4×4.

The inverse non-separable secondary transform according to an embodiment of the present disclosure includes at least one of a reduced secondary transform (RST) having a matrix of an L×16 form, wherein L is smaller than or equal to 16, a sparse orthonormal transform (SOT) having a matrix of a 16×16 form, a Givens rotation-based transform having 16 inputs and 16 outputs, or a layered givens transform having 16 inputs and 16 outputs and applying a designated permutation between two neighboring Givens rotation layers. The inverse primary transform may include a horizontal transform and a vertical transform for the transform block, and the horizontal transform and the vertical transform may be configured by a combination of DCT-2, DST-7, and DCT-8.

Advantageous Effects

According to an embodiment of the present disclosure, a transform matrix can be designed with low complexity.

Furthermore, according to an embodiment of the present disclosure, a computational load can be reduced by selectively applying a non-separable secondary transform based on the size of a transform block.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates a schematic block diagram of an encoder performing encoding of a video signal as an embodiment to which the present disclosure is applied.

FIG. 2 illustrates a schematic block diagram of a decoder performing decoding of a video signal as an embodiment to which the present disclosure is applied.

FIG. 3 illustrates embodiments to which the present disclosure may be applied, wherein FIGS. 3A, 3B, 3C, and 3D are diagrams for describing block division structures based on a quadtree, a binary tree, a ternary tree, and an asymmetric tree, respectively.

FIGS. 4 and 5 are embodiments to which the present disclosure is applied, wherein FIG. 4 illustrates a schematic block diagram of transform and quantization units and inverse quantization unit and inverse transform units within the encoder, and FIG. 5 illustrates a schematic block diagram of inverse quantization and inverse transform units within the decoder.

FIGS. 6a and 6b illustrate examples of tables for determining a transform type in a horizontal direction and vertical direction for each prediction mode.

FIG. 7 is an embodiment to which the present disclosure is applied, and is a flowchart illustrating an encoding process performed by multiple transform selections (MTS).

FIG. 8 is an embodiment to which the present disclosure is applied, and is a flowchart illustrating a decoding process in which MTS is performed.

FIG. 9 is an embodiment to which the present disclosure is applied, and is a flowchart for describing a process of encoding an MTS flag and an MTS index.

FIG. 10 is an embodiment to which the present disclosure is applied, and is a flowchart for illustrating a decoding process of applying a horizontal transform or a vertical transform to a row or column based on an MTS flag and an MTS index.

FIG. 11 is an embodiment to which the present disclosure is applied, and illustrates a flowchart in which an inverse transform is performed based on a transform-related parameter.

FIG. 12 is an embodiment to which the present disclosure is applied, and is a table illustrating that a transform set is assigned to each intra-prediction mode in an NSST.

FIG. 13 is an embodiment to which the present disclosure is applied, and illustrates a calculation flow diagram for Givens rotation.

FIG. 14 is an embodiment to which the present disclosure is applied, and illustrates one round configuration in a 4×4 NSST composed of a Givens rotation layer and permutations.

FIG. 15 is an embodiment to which the present disclosure is applied, and is a block diagram for describing operations of a forward reduced transform and an inverse reduced transform.

FIG. 16 is an embodiment to which the present disclosure is applied, and is a diagram illustrating a process of performing an inverse scan from a 64-th to a 17-th according to an inverse scan order.

FIG. 17 is an embodiment to which the present disclosure is applied, and illustrates three forward scan orders for a transform coefficient block.

FIG. 18 is an embodiment to which the present disclosure is applied, and illustrates the locations of valid transform coefficients and a forward scan order for each 4×4 block when a diagonal scan is applied and a 4×4 RST is applied in a top-left 4×8 block.

FIG. 19 is an embodiment to which the present disclosure is applied, and illustrates a case where valid transform coefficients of two 4×4 blocks are merged into a single 4×4 block when a diagonal scan is applied and a 4×4 RST is applied in a top-left 4×8 block.

FIG. 20 is an embodiment to which the present disclosure is applied, and illustrates a flowchart in which a video signal is encoded based on a reduced secondary transform (RST).

FIG. 21 is an embodiment to which the present disclosure is applied, and illustrates a flowchart in which a video signal is decoded based on a reduced secondary transform (RST).

FIG. 22 illustrates an example of a transform block and a top-left 4×4 region according to an embodiment of the present disclosure.

FIG. 23 illustrates an example of a table for determining a transform type in a horizontal direction and a vertical direction according to a prediction mode, wherein FIG. 23a illustrates a transform pair to which a residual generated through an intra prediction is applied, and FIG. 23b illustrates a transform pair to which a residual generated through an inter prediction is applied.

FIG. 24 illustrates a flowchart of a method of encoding a video signal according to an embodiment of the present disclosure.

FIG. 25 illustrates an example of a transform process according to the size of a transform block in an encoding process of a video signal according to an embodiment of the present disclosure.

FIG. 26 illustrates a flowchart of a process of decoding a video signal according to an embodiment of the present disclosure.

FIG. 27 illustrates an example of a transform process according to the size of a transform block in a process of decoding a video signal according to an embodiment of the present disclosure.

FIG. 28 illustrates an example of a video coding system as an embodiment to which the present disclosure is applied.

FIG. 29 illustrates an example of a video streaming system as an embodiment to which the present disclosure is applied.

MODE FOR INVENTION

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core function of each structure and device.

Further, although general terms widely used currently are selected as the terms in the present disclosure as much as possible, a term that is arbitrarily selected by the applicant is used in a specific case. Since the meaning of the term will be clearly described in the corresponding part of the description in such a case, it is understood that the present disclosure will not be simply interpreted by the terms only used in the description of the present disclosure, but the meaning of the terms should be figured out.

Specific terminologies used in the description below may be provided to help the understanding of the present disclosure. Furthermore, the specific terminology may be modified into other forms within the scope of the technical concept of the present disclosure. For example, a signal, data, a sample, a picture, a frame, a block, etc may be properly replaced and interpreted in each coding process.

In the present disclosure, a 'processing unit' refers to a unit on which encoding/decoding process such as prediction, transform and/or quantization is performed. The processing unit may also be interpreted as the meaning including a unit for a luminance component and a unit for a chrominance component. For example, the processing unit may correspond to a block, a coding unit (CU), a prediction unit (PU) or a transform unit (TU).

The processing unit may also be interpreted as a unit for a luminance component or a unit for a chrominance component. For example, the processing unit may correspond to a coding tree block (CTB), a coding block (CB), a prediction unit (PU) or a transform block (TB) for the luminance component. Alternatively, the processing unit may correspond to a CTB, a CB, a PU or a TB for the chrominance component. The processing unit is not limited thereto and may be interpreted as the meaning including a unit for the luminance component and a unit for the chrominance component.

In addition, the processing unit is not necessarily limited to a square block and may be configured in a polygonal shape having three or more vertexes.

In the present disclosure, a pixel is commonly called a sample. In addition, using a sample may mean using a pixel value or the like.

FIG. 1 is a schematic block diagram of an encoder in which encoding of a video signal is performed as an embodiment to which the present disclosure is applied.

Referring to FIG. 1, the encoder 100 may be configured to include an image division unit 110, a transform unit 120, a quantization unit 130, a dequantization unit 140, an inverse transform unit 150, a filtering unit 160, a decoded picture buffer (DPB) 170, an inter-prediction unit 180, an intra-prediction unit 185, and an entropy encoding unit 190 . . . .

The image division unit 110 may divide an input image (or picture or frame) input into the encoder 100 into one or more processing units. For example, the processing unit may be a Coding Tree Unit (CTU), a Coding Unit (CU), a Prediction Unit (PU), or a Transform Unit (TU). In the following description, a transform unit (TU), that is, a unit on which a transform is performed is collectively referred to as a transform block.

However, the terms are only used for the convenience of description of the present disclosure and the present disclosure is not limited to the definition of the terms. In addition, in the present disclosure, for the convenience of the description, the term coding unit is used as a unit used in encoding or decoding a video signal, but the present disclosure is not limited thereto and may be appropriately interpreted according to the present disclosure.

The encoder 100 subtracts a prediction signal output from the inter-prediction unit 180 or the intra-prediction unit 185 from the input image signal to generate a residual signal and the generated residual signal is transmitted to the transform unit 120.

The transform unit 120 may generate a transform coefficient by applying a transform technique to the residual signal. A transform process may be applied to a quadtree structure square block and a block (square or rectangle) divided by a binary tree structure, a ternary tree structure, or an asymmetric tree structure.

The transform unit 120 may perform a transform based on a plurality of transforms (or transform combinations), and the transform scheme may be referred to as multiple transform selection (MTS). The MTS may also be referred to as an Adaptive Multiple Transform (AMT) or an Enhanced Multiple Transform (EMT).

The MTS (or AMT or EMT) may refer to a transform scheme performed based on a transform (or transform combinations) adaptively selected from the plurality of transforms (or transform combinations).

A plurality of transforms (or transform combinations) may be determined based on a kernel of a discrete cosine transform (DCT) or discrete sine transform (DST) type as illustrated in FIGS. 6a and 6b of the present disclosure. In the present disclosure, the transform type may be expressed like DCT-Type 2, DCT-II, DCT-2, DCT2, for example, and is generally indicated as DCT-2 in the following description.

The transform unit 120 according to an embodiment of the present disclosure may perform the following embodiments.

The transform unit 120 may be configured to apply a forward primary transform to each transform block including residual samples in each of a horizontal direction and vertical direction, omit the application of a forward secondary transform to a transform block to which the primary transform has been applied when the size of the transform block is smaller than or equal to 4×4, and apply a forward non-separable secondary transform to the transform block when the size of a transform block is greater than 4×4. Furthermore, the transform unit 120 may be configured to apply the forward non-separable secondary transform to a top-left 4×4 region of the transform block when the size of a transform block is greater than 4×4.

The quantization unit 130 may quantize the transform coefficient and transmits the quantized transform coefficient to the entropy encoding unit 190 and the entropy encoding unit 190 may entropy-code a quantized signal and output the entropy-coded quantized signal as a bitstream.

Although the transform unit 120 and the quantization unit 130 are described as separate functional units, the present disclosure is not limited thereto and may be combined into one functional unit. The dequantization unit 140 and the inverse transform unit 150 may also be similarly combined into one functional unit.

A quantized signal output from the quantization unit 130 may be used for generating the prediction signal. For example, inverse quantization and inverse transform are applied to the quantized signal through the dequantization unit 140 and the inverse transform unit 1850 in a loop to reconstruct the residual signal. The reconstructed residual signal is added to the prediction signal output from the inter-prediction unit 180 or the intra-prediction unit 185 to generate a reconstructed signal.

Meanwhile, deterioration in which a block boundary is shown may occur due to a quantization error which occurs during such a compression process. Such a phenomenon is referred to as blocking artifacts and this is one of key elements for evaluating an image quality. A filtering process may be performed in order to reduce the deterioration. Blocking deterioration is removed and an error for the current picture is reduced through the filtering process to enhance the image quality.

The filtering unit 160 applies filtering to the reconstructed signal and outputs the applied reconstructed signal to a reproduction device or transmits the output reconstructed signal to the decoded picture buffer 170. The inter-prediction unit 170 may use the filtered signal transmitted to the decoded picture buffer 180 as the reference picture. As such, the filtered picture is used as the reference picture in the inter prediction mode to enhance the image quality and the encoding efficiency.

The decoded picture buffer 170 may store the filtered picture in order to use the filtered picture as the reference picture in the inter-prediction unit 180.

The inter-prediction unit 180 performs a temporal prediction and/or spatial prediction in order to remove temporal redundancy and/or spatial redundancy by referring to the reconstructed picture. In this case, since the reference picture used for prediction is a transformed signal that is quantized and dequantized in units of the block at the time of encoding/decoding in the previous time, blocking artifacts or ringing artifacts may exist.

Accordingly, the inter-prediction unit 180 may interpolate a signal between pixels in units of a sub-pixel by applying a low-pass filter in order to solve performance degradation due to discontinuity or quantization of such a signal. In this case, the sub-pixel means a virtual pixel generated by applying an interpolation filter and an integer pixel means an actual pixel which exists in the reconstructed picture. As an interpolation method, linear interpolation, bi-linear interpolation, wiener filter, and the like may be adopted.

An interpolation filter is applied to the reconstructed picture to enhance precision of prediction. For example, the inter-prediction unit 180 applies the interpolation filter to the integer pixel to generate an interpolated pixel and the prediction may be performed by using an interpolated block constituted by the interpolated pixels as the prediction block.

Meanwhile, the intra-prediction unit 185 may predict the current block by referring to samples in the vicinity of a block which is to be subjected to current encoding. The intra-prediction unit 185 may perform the following process in order to perform the intra prediction. First, a reference sample may be prepared, which is required for generating the prediction signal. In addition, the prediction signal may be generated by using the prepared reference sample. Thereafter, the prediction mode is encoded. In this case, the reference sample may be prepared through reference sample padding and/or reference sample filtering. Since the reference sample is subjected to prediction and reconstruction processes, a quantization error may exist. Accordingly, a reference sample filtering process may be performed with respect to each prediction mode used for the intra prediction in order to reduce such an error.

The prediction signal generated through the inter-prediction unit 180 or the intra-prediction unit 185 may be used for generating the reconstructed signal or used for generating the residual signal.

FIG. 2 is a schematic block diagram of a decoder in which decoding of a video signal is performed as an embodiment to which the present disclosure is applied.

Referring to FIG. 2, the decoder 200 may be configured to include a parsing unit (not illustrated), an entropy decoding unit 210, a dequantization unit 220, an inverse transform unit 230, a filtering unit 240, a decoded picture buffer (DPB) unit 250, an inter-prediction unit 260, and an intra-prediction unit 265.

In addition, a reconstructed video signal output through the decoder 200 may be reproduced through a reproduction device.

The decoder 200 may receive the signal output from the encoder 100 of FIG. 1 and the received signal may be entropy-decoded through the entropy decoding unit 210.

The dequantization unit 220 obtains the transform coefficient from an entropy-decoded signal by using quantization step size information.

The inverse transform unit 230 inversely transforms the transform coefficient to obtain the residual signal.

The inverse transform unit 230 according to an embodiment of the present disclosure may be configured to omit the application of an inverse non-separable secondary transform to a transform block when the size of the transform block is smaller than or equal to 4×4, apply an inverse non-separable secondary transform to the transform block when the size of the transform block is greater than 4×4, and apply an inverse primary transform to the transform block separately in the horizontal direction and the vertical direction. The inverse transform unit 230 according to an embodiment of the present disclosure may be configured to apply an inverse non-separable secondary transform to a top-left 4×4 region of the transform block when the size of the transform block is greater than 4×4.

Although the dequantization unit 220 and the inverse transform unit 230 are described as separate functional units, the present disclosure is not limited thereto and may be combined into one functional unit.

The obtained residual signal is added to the prediction signal output from the inter-prediction unit 260 or the intra-prediction unit 265 to generate the reconstructed signal.

The filtering unit 240 applies filtering to the reconstructed signal and outputs the applied reconstructed signal to a generation device or transmits the output reconstructed signal to the decoded picture buffer unit 250. The inter-prediction unit 250 may use the filtered signal transmitted to the decoded picture buffer unit 260 as the reference picture.

In the present disclosure, the embodiments described in the transform unit 120 and the respective functional units of the encoder 100 may be equally applied to the inverse transform unit 230 and the corresponding functional units of the decoder, respectively.

FIG. 3 are embodiments to which the present disclosure may be applied, FIG. 3*a* is a diagram for describing a block split structure based on a quadtree (hereinafter referred to as a "QT"), FIG. 3*b* is a diagram for describing a block split structure based on a binary tree (hereinafter referred to as a "BT"), FIG. 3*c* is a diagram for describing a block split structure based on a ternary tree (hereinafter referred to as a "TT"), and FIG. 3*d* is a diagram for describing a block split structure based on an asymmetric tree (hereinafter referred to as an "AT").

In video coding, one block may be split based on a quadtree (QT). Furthermore, one subblock split by the QT may be further split recursively using the QT. A leaf block that is no longer QT split may be split using at least one method of a binary tree (BT), a ternary tree (TT) or an asymmetric tree (AT). The BT may have two types of splits of a horizontal BT (2N×N, 2N×N) and a vertical BT (N×2N, N×2N). The TT may have two types of splits of a horizontal TT (2N×½N, 2N×N, 2N×½N) and a vertical TT (½N×2N, N×2N, ½N×2N). The AT may have four types of splits of a horizontal-up AT (2N×½N, 2N×3/2N), a horizontal-down AT (2N×3/2N, 2N×½N), a vertical-left AT (½N×2N, 3/2N×2N), and a vertical-right AT (3/2N×2N, ½N×2N). Each BT, TT, or AT may be further split recursively using the BT, TT, or AT.

FIG. 3*a* illustrates an example of a QT split. A block A may be split into four subblocks A0, A1, A2, and A3 by a QT. The subblock A1 may be split into four subblocks B0, B1, B2, and B3 by a QT.

FIG. 3*b* illustrates an example of a BT split. A block B3 that is no longer split by a QT may be split into vertical BTs C0 and C1 or horizontal BTs D0 and D1. As in the block C0, each subblock may be further split recursively like the form of horizontal BTs E0 and E1 or vertical BTs F0 and F1.

FIG. 3*c* illustrates an example of a TT split. A block B3 that is no longer split by a QT may be split into vertical TTs C0, C1, and C2 or horizontal TTs D0, D1, and D2. As in the block C1, each subblock may be further split recursively like the form of horizontal TTs E0, E1, and E2 or vertical TTs F0, F1, and F2.

FIG. 3*d* illustrates an example of an AT split. A block B3 that is no longer split by a QT may be split into vertical ATs C0 and C1 or horizontal ATs D0 and D1. As in the block C1, each subblock may be further split recursively like the form of horizontal ATs E0 and E1 or vertical TTs F0 and F1.

Meanwhile, BT, TT, and AT splits may be split together. For example, a subblock split by a BT may be split by a TT or AT. Furthermore, a subblock split by a TT may be split by a BT or AT. A subblock split by an AT may be split by a BT or TT. For example, after a horizontal BT split, each subblock may be split into vertical BTs or after a vertical BT split, each subblock may be split into horizontal BTs. The two types of split methods are different in a split sequence, but have the same finally split shape.

Furthermore, if a block is split, the sequence that the block is searched may be defined in various ways. In general, the search is performed from left to right or from top to bottom. To search a block may mean a sequence for determining whether to split an additional block of each split subblock or may mean a coding sequence of each subblock if a block is no longer split or may mean a search sequence when information of another neighbor block is referred in a subblock.

A transform may be performed for each processing unit (or transform unit) divided by a division structure, such as FIGS. 3a to 3d. In particular, a division may be performed for each row direction and each column direction, and a transform matrix may be applied. According to an embodiment of the present disclosure, a different transform type may be used based on the length of a processing unit (or transform unit) in the row direction or column direction.

FIGS. 4 and 5 are embodiments to which the present disclosure is applied. FIG. 4 illustrates a schematic block diagram of a transform and quantization unit 120/130 and a dequantization and transform unit 140/150 within the encoder, and FIG. 5 illustrates a schematic block diagram of a dequantization and transform unit 220/230 within the decoder.

Referring to FIG. 4, the transform and quantization unit 120/130 may include a primary transform unit 121, a secondary transform unit 122 and the quantization unit 130. The dequantization and transform unit 140/150 may include the dequantization unit 140, an inverse secondary transform unit 151 and an inverse primary transform unit 152.

Referring to FIG. 5, the dequantization and transform unit 220/230 may include the dequantization unit 220, an inverse secondary transform unit 231 and an inverse primary transform unit 232.

In the present disclosure, when a transform is performed, the transform may be performed through a plurality of steps. For example, as in FIG. 4, two steps of a primary transform and a secondary transform may be applied or more transform steps may be used according to an algorithm. In this case, the primary transform may be referred to as a core transform.

The primary transform unit 121 may apply a primary transform on a residual signal. In this case, the primary transform may be pre-defined in a table form in the encoder and/or the decoder.

Furthermore, combinations of several transform types (DCT-2, DST-7, DCT-8) of MTS may be used for the primary transform. For example, a transform type may be determined as in the tables illustrated in FIGS. 6a and 6b.

The secondary transform unit 122 may apply a secondary transform to a primary-transformed signal. In this case, the secondary transform may be pre-defined as a table in the encoder and/or the decoder.

According to an embodiment of the present disclosure, the secondary transform unit 122 may be configured to omit the application of a forward non-separable secondary transform (NSST) to a transform block to which a primary transform has been applied when the size of the transform block is smaller than or equal to 4×4 and to apply the forward non-separable secondary transform to the transform block when the size of the transform block is greater than 4×4. Furthermore, the secondary transform unit 122 may be configured to apply the forward non-separable secondary transform (NSST) to a top-left 4×4 region of the transform block.

In one embodiment, the non-separable secondary transform (NSST) may be conditionally applied to the secondary transform. For example, the NSST may be applied to only an intra prediction block, and may have a transform set which may be applied to each prediction mode group.

In this case, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode has a different transform set and the corresponding transform set may include two transforms. In respect to the remaining direction modes, each transform set may include three transforms.

The quantization unit 130 may perform quantization on a secondary-transformed signal.

The inverse quantization unit and the inverse transform unit 140/150 inversely perform the aforementioned process, and a redundant description thereof is omitted.

FIG. 5 is a schematic block diagram of a dequantization unit 220 and an inverse transform unit 230 in a decoder.

Referring to FIG. 5 above, the dequantization and inverse transform units 220 and 230 may include a dequantization unit 220, an inverse secondary transform unit 231, and an inverse primary transform unit 232.

The dequantization unit 220 obtains the transform coefficient from an entropy-decoded signal by using quantization step size information.

The inverse secondary transform unit 231 performs an inverse secondary transform for the transform coefficients. In this case, the inverse secondary transform represents an inverse transform of the secondary transform described in FIG. 4.

The inverse secondary transform unit 231 according to an embodiment of the present disclosure may be configured to omit the application of an inverse non-separable secondary transform to a transform block when the size of the transform block is smaller than or equal to 4×4, apply the inverse non-separable secondary transform to the transform block when the size of a transform block is greater than 4×4, and apply an inverse primary transform to the transform block separately in the horizontal direction and the vertical direction. The inverse secondary transform unit 231 according to an embodiment of the present disclosure may be configured to apply the inverse non-separable secondary transform to a top-left 4×4 region of the transform block when the size of the transform block is greater than 4×4.

The inverse primary transform unit 232 performs an inverse primary transform for the inverse secondary transformed signal (or block) and obtains the residual signal. In this case, the inverse primary transform represents the inverse transform of the primary transform described in FIG. 4.

In one embodiment, combinations of several transforms (DCT-2, DST-7, DCT-8) of MTS may be applied to the primary transform. For example, a transform type may be determined as in the tables illustrated in FIGS. 6a and 6b O|.

FIGS. 6a and 6b illustrate examples of tables for determining a transform type for a horizontal direction and a vertical direction for each prediction mode. FIG. 6a illustrates an example of the table for determining transform types in the horizontal/vertical direction in an intra-prediction mode. FIG. 6b illustrates an example of the table for determining transform types for the horizontal/vertical direction in an inter-prediction mode. FIGS. 6a and 6b are examples of combination tables for determining transform types, illustrates MTS combinations applied to a joint exploration model (JEM). Another combination may also be used. For example, the table of FIG. 6b may be used for both an intra-prediction and an inter-prediction. Examples applied to the JEM are basically described with reference to FIGS. 6a and 6b.

In the JEM, the application of MTS may become on/off in a block unit (in the case of HEVC, in a CU unit) because a syntax element called EMT_CU_flag (or MTS_CU_flag) is introduced. That is, in the intra-prediction mode, when MTS_CU_flag is 0, DCT-2 or DST-7 (for a 4×4 block) in the existing high efficiency video coding (HEVC) is used. When MTS_CU_flag is 1, an MTS combination proposed in FIG. 6a is used. A possible MTS combination may be different depending on an intra-prediction mode as in FIG. 6a. For example, a total of possible four combinations are permitted because DST-7 and DCT-5 are used in the horizontal direction and DST-7 and DCT-8 are used in the vertical direction, with respect to 14, 15, 16, 17, 18, 19, 20, 21, 22 modes. Accordingly, there is a need for signaling of information on which one of the four combinations is used. One of the four combinations is selected through MTS_TU_index having two bits. FIG. 6b illustrates MTS combinations which may be applied in an inter-prediction mode. Unlike in FIG. 6a, a combination which is possible based on only DST-7 and DCT-8 is determined. According to an embodiment of the present disclosure, EMT_CU_flag may be used instead of MTS_CU_flag.

FIG. 7 is an embodiment to which the present disclosure is applied, and is a flowchart illustrating an encoding process in which MTS is performed.

In the present disclosure, basically, embodiments in which transforms are applied in the horizontal direction and the vertical direction are basically described. However, a transform combination may be configured with a non-separable transform.

Alternatively, a mixture of separable transforms and non-separable transforms may be configured. In this case, if the non-separable transform is used, transform selection for each row/column or selection for each horizontal/vertical direction becomes unnecessary. The transform combinations of FIG. 6a or 6b may be used only when the separable transform is selected.

Furthermore, methods proposed in the present disclosure may be applied regardless of a primary transform or a secondary transform. That is, there is no restriction in that the methods should be applied to any one of the primary transform and the secondary transform, and both the primary transform and the secondary transform may be applied. In this case, the primary transform may mean a transform for first transforming a residual block. The secondary transform may mean a transform for applying a transform to a block generated as a result of the primary transform. According to an embodiment of the present disclosure, when the size of a transform block is smaller than or equal to 4×4, only a primary transform may be applied in the state in which a secondary transform has been omitted. When the size of the transform block is greater than 4×4, the secondary transform may be applied to a top-left 4×4 region.

First, the encoder 100 may determine a transform configuration group corresponding to a current block (S710). In this case, the transform configuration group may be composed of combinations, such as FIGS. 6a and 6b.

The encoder may perform a transform on available candidate transform combinations within the transform configuration group (S720).

As a result of the execution of the transform, the encoder may determine or select a transform combination having the smallest rate distortion (RD) cost (S730).

The encoder may encode a transform combination index corresponding to the selected transform combination (S740).

FIG. 8 is an embodiment to which the present disclosure is applied, and is a flowchart illustrating a decoding process in which MTS is performed.

First, the decoder 200 may determine a transform configuration group for a current block (S810). The decoder 200 may parse (or obtain) a transform combination index from a video signal. In this case, the transform combination index may correspond to one of a plurality of transform combinations within the transform configuration group (S820). For example, the transform configuration group may include DST-4, DCT-4, DST-7 and DCT-8. The transform combination index may be called an MTS index. In an embodiment, the transform configuration group may be configured based on at least one of a prediction mode, a block size or a block shape of the current block.

The decoder 100 may derive a transform combination corresponding to a transform combination index (S830). In this case, the transform combination may be composed of a horizontal transform and a vertical transform, and may include at least one of DCT-2, DST-7 or DCT-8. Furthermore, the transform combinations described with reference to FIG. 6a or 6b may be used for the transform combination. That is, in the present disclosure, a configuration based on another transform combination according to another embodiment is possible.

The decoder 100 may perform an inverse transform on the current block based on the derived transform combination (S840). If the transform combination is configured with a row (horizontal) transform and a column (vertical) transform, after the row (horizontal) transform is first applied, the column (vertical) transform may be applied, but the present disclosure is not limited thereto. If the transform combination is configured in an opposite way or configured with non-separable transforms, a non-separable transform may be applied.

In an embodiment, if a vertical transform or a horizontal transform is DST-7 or DCT-8, an inverse transform of DST-7 or an inverse transform of DST-8 may be applied for each column, and then applied for each row. Furthermore, in the vertical transform or the horizontal transform, a different transform may be applied for each row and/or for each column.

In an embodiment, a transform combination index may be obtained based on an MTS flag indicating whether MTS is performed. That is, the transform combination index may be obtained only when MTS is performed based on an MTS flag. Furthermore, the decoder 100 may check whether the number of non-zero coefficients is greater than a threshold value. In this case, the transform combination index may be obtained only when the number of non-zero coefficients is greater than the threshold value.

In an embodiment, the MTS flag or the MTS index may be defined in at least one level of a sequence, a picture, a slice, a block, a coding unit, a transform unit, or a prediction unit.

In an embodiment, an inverse transform may be applied only when both the width and height of a transform unit are 32 or less.

Meanwhile, in another embodiment, the process of determining the transform configuration group and the process of parsing the transform combination index may be simultaneously performed. Alternatively, step S810 may be pre-configured in the encoder 100 and/or the decoder 200 and omitted.

FIG. 9 is an embodiment to which the present disclosure is applied, and is a flowchart for describing a process of encoding an MTS flag and an MTS index.

The encoder 100 may determine whether MTS is applied to a current block (S910).

If the MTS is applied, the encoder 100 may encode the MTS flag=1 (S920).

Furthermore, the encoder 100 may determine an MTS index based on at least one of a prediction mode, horizontal transform, or vertical transform of the current block (S930). In this case, the MTS index means an index indicative of any one of a plurality of transform combinations for each intra-prediction mode, and the MTS index may be transmitted for each transform unit.

When the MTS index is determined, the encoder 100 may encode the MTS index determined at step S930 (S940).

Meanwhile, if the MTS is not applied, the encoder 100 may encode MTS flag=0 (S950).

FIG. 10 is an embodiment to which the present disclosure is applied, and is a flowchart for illustrating a decoding process of applying a horizontal transform or a vertical transform to a row or column based on an MTS flag and an MTS index.

The decoder 200 may parse an MTS flag from a bit stream (S1010). In this case, the MTS flag may indicate whether MTS is applied to a current block.

The decoder 200 may check whether the MTS is applied to the current block based on the MTS flag (S1020). For example, the decoder 200 may check whether the MTS flag is 1.

When the MTS flag is 1, the decoder 200 may check whether the number of non-zero coefficients is greater than (or equal to or greater than) a threshold value (S1030). For example, the threshold value for the number of transform coefficients may be set to 2. The threshold value may be set based on a block size or the size of a transform unit When the number of non-zero coefficients is greater than the threshold value, the decoder 200 may parse an MTS index (S1040). In this case, the MTS index means an index indicative of any one of a plurality of transform combinations for each intra-prediction mode or each inter-prediction mode. The MTS index may be transmitted for each transform unit. Furthermore, the MTS index may mean an index indicative of any one transform combination defined in a pre-configured transform combination table. In this case, the pre-configured transform combination table may mean the tables of FIG. 6a or 6b, but the present disclosure is not limited thereto.

The decoder 100 may derive or determine a horizontal transform and a vertical transform based on at least one of the MTS index or a prediction mode (S1050). Furthermore, the decoder 100 may derive a transform combination corresponding to the MTS index. For example, the decoder 100 may derive or determine a horizontal transform and a vertical transform corresponding to the MTS index.

Meanwhile, when the number of non-zero coefficients is not greater than the threshold value, the decoder 200 may apply a pre-configured vertical inverse transform for each column (S1060). For example, the vertical inverse transform may be an inverse transform of DST-7. Furthermore, the vertical inverse transform may be an inverse transform of DST-8

Furthermore, the decoder may apply a pre-configured horizontal inverse transform for each row (S1070). For example, the horizontal inverse transform may be an inverse transform of DST-7. Furthermore, the horizontal inverse transform may be an inverse transform of DST-8.

That is, when the number of non-zero coefficients is not greater than the threshold value, a transform type pre-configured in the encoder 100 or the decoder 200 may be used. For example, not a transform type defined in a transform combination table, such as FIG. 6a or 6b, but a transform type (e.g., DCT-2) which is commonly used may be used.

Meanwhile, when the MTS flag is 0, the decoder 200 may apply a pre-configured vertical inverse transform for each column (S1080). For example, the vertical inverse transform may be an inverse transform of DCT-2.

Furthermore, the decoder 200 may apply a pre-configured horizontal inverse transform for each row (S1090). For example, the horizontal inverse transform may be an inverse transform of DCT-2. That is, when the MTS flag is 0, a transform type pre-configured in the encoder or the decoder may be used. For example, not a transform type defined in a transform combination table, such as FIG. 6a or 6b, but a transform type which is commonly used may be used.

FIG. 11 is an embodiment to which the present disclosure is applied, and illustrates a flowchart in which an inverse transform is performed based on a transform-related parameter.

The decoder 200 to which the present disclosure is applied may obtain sps_mts_intra_enabled_flag or sps_mts_inter_enabled_flag (S1110). In this case, sps_mts_intra_enabled_flag indicates whether tu_mts_flag is present in a residual coding syntax a coding unit to which an intra-prediction is applied (intra-coding unit). For example, when sps_mts_intra_enabled_flag=0, tu_mts_flag is not present in the residual coding syntax of the intra-coding unit. When sps_mts_intra_enabled_flag=0, tu_mts_flag is present in the residual coding syntax of the intra-coding unit. Furthermore, sps_mts_inter_enabled_flag indicates whether tu_mts_flag is present in a residual coding syntax of a coding unit to which an inter-prediction is applied (inter-coding unit). For example, when sps_mts_inter_enabled_flag=0, tu_mts_flag is not present in the residual coding syntax of the inter-coding unit. When sps_mts_inter_enabled_flag=0, tu_mts_flag is present in the residual coding syntax of the inter-coding unit.

The decoder 200 may obtain tu_mts_flag based on sps_mts_intra_enabled_flag or sps_mts_inter_enabled_flag (S1120). For example, when sps_mts_intra_enabled_flag=1 or sps_mts_inter_enabled_flag=1, the decoder 200 may obtain tu_mts_flag. In this case, tu_mts_flag indicates whether MTS is applied to a residual sample of a luminance transform unit. For example, when tu_mts_flag=0, the MTS is not applied to a residual sample of the luminance transform unit. When tu_mts_flag=1, the MTS is applied to a residual sample of the luminance transform unit. At least one of embodiments described in the present disclosure may be applied with respect to Tu_mts_flag=1.

The decoder 200 may obtain mts_idx based on tu_mts_flag (S1130). For example, when tu_mts_flag=1, the decoder may obtain mts_idx. In this case, mts_idx indicates whether which transform kernel is applied to luminance residual samples according to the horizontal and/or vertical direction of a current transform block. For example, at least one of the embodiments of the present disclosure may be applied to mts_idx. As a detailed example, at least one of the embodiments of FIGS. 6a and 6b, 44a, or 44b may be applied.

The decoder 200 may derive a transform kernel corresponding to mts_idx (S1140). For example, the transform kernel corresponding to mts_idx may be divided and defined into a horizontal transform and a vertical transform.

For another example, different transform kernels may be applied to the horizontal transform and the vertical transform, but the present disclosure is not limited thereto. The same transform kernel may be applied to the horizontal transform and the vertical transform.

In an embodiment, mts_idx may be defined like Table 1.

TABLE 1

| mts_idx[ x0 ][ y0 ] | trTypeHor | trTypeVer |
|---|---|---|
| 0 | 0 | 0 |
| 1 | 1 | 1 |
| 2 | 2 | 1 |
| 3 | 1 | 2 |
| 4 | 2 | 2 |

Furthermore, the decoder 200 may perform an inverse transform based on the transform kernel derived at step S1140 (S1150).

In FIG. 11, an embodiment in which in order to determine whether to apply MTS, tu_mts_flag is obtained, mts_idx is obtained based on the obtained tu_mts_flag value, and a transform kernel is determined has been basically described, but the present disclosure is not limited thereto. For example, the decoder 200 may determine a transform kernel by directly parsing mts_idx without parsing tu_mts_flag. In this case, Table 1 may be used. That is, when the mts_idx value indicates 0, DCT-2 may be applied in the horizontal/vertical direction. When the mts_idx value indicates a value other than 0, DST-7 or DCT-8 may be applied based on the mts_idx value.

In another embodiment of the present disclosure, a decoding process of performing a transform process is described.

The decoder 200 may check a transform size (nTbS). In this case, the transform size (nTbS) may be a variable indicative of a horizontal sample size of scaled transform coefficients.

The decoder 200 may check a transform kernel type (trType). In this case, the transform kernel type (trType) may be a variable indicative of the type of transform kernel, and various embodiments of the present disclosure may be applied. The transform kernel type (trType) may include a horizontal transform kernel type (trTypeHor) and a vertical transform kernel type (trTypeVer).

Referring to Table 1, the transform kernel type (trType) may indicate DCT-2 when it is 0, may indicate DST-7 when it is 1, and may indicate DCT-8 when it is 2.

The decoder 200 may perform a transform matrix multiplication based on at least one of a transform size (nTbS) or a transform kernel type.

For another example, when the transform kernel type is 1 and the transform size is 4, a previously determined transform matrix 1 may be applied when a transform matrix multiplication is performed.

For another example, when the transform kernel type is 1 and the transform size is 8, a previously determined transform matrix 2 may be applied when a transform matrix multiplication is performed.

For another example, when the transform kernel type is 1 and the transform size is 16, a previously determined transform matrix 3 may be applied when a transform matrix multiplication is performed.

For another example, when the transform kernel type is 1 and the transform size is 32, a previously defined transform matrix 4 may be applied.

Likewise, when the transform kernel type is 2 and the transform size is 4, 8, 16, and 32, a previously defined transform matrices 5, 6, 7, and 8 may be applied, respectively.

In this case, each of the previously defined transform matrices 1 to 8 may correspond to any one of various types of transform matrices. For example, the transform matrices of types illustrated in FIG. 6 may be applied.

The decoder 200 may derive a transform sample based on a transform matrix multiplication.

The embodiments may be used, but the present disclosure is not limited thereto. The above embodiment and other embodiments of the present disclosure may be combined and used.

FIG. 12 is an embodiment to which the present disclosure is applied, and is a table illustrating that a transform set is assigned to each intra-prediction mode in an NSST.

The secondary transform unit 122 may apply a secondary transform to a primary transformed signal. In this case, the secondary transform may be pre-defined as a table in the encoder 100 and/or the decoder 200.

In an embodiment, an NSST may be conditionally applied to the secondary transform. For example, the NSST is applied only in the case of an intra-prediction block, and may have an applicable transform set for each prediction mode group.

According to an embodiment of the present disclosure, the NSST may be omitted when the size of a transform block corresponds to 4×4, and the NSST may be applied to only a top-left 4×4 region when the size of the transform block is greater than 4×4.

In this case, the prediction mode group may be configured based on symmetry for a prediction direction. For example, a prediction mode 52 and a prediction mode 16 are symmetrical to each other with respect to a prediction mode 34 (diagonal direction), and thus may form one group, so the same transform set may be applied to the prediction mode 52 and the prediction mode 16. In this case, when a transform for the prediction mode 52 is applied, input data is transposed and applied. The reason for this is that the prediction mode 52 and the prediction mode 16 have the same transform set.

Meanwhile, the planar mode and the DC mode have respective transform sets because symmetry for a direction is not present. A corresponding transform set may be configured with two transforms. With respect to the remaining direction modes, three transforms may be configured for each transform set, but the present disclosure is not limited thereto. Each transform set may be configured with a plurality of transforms.

FIG. 13 is an embodiment to which the present disclosure is applied, and illustrates a calculation flow diagram for Givens rotation.

In another embodiment, the NSST is not applied to all of primary transformed blocks, but may be applied to only a top-left 8×8 region. For example, if the size of a block is 8×8 or more, an 8×8 NSST is applied. If the size of a block is less than 8×8, a 4×4 NSST is applied. In this case, the block is divided into 4×4 blocks and the 4×4 NSST is applied to each of the blocks. According to an embodiment of the present disclosure, the NSST may be omitted when the size of a transform block corresponds to 4×4, and the NSST may be applied to only a top-left 4×4 region when the size of the transform block is greater than 4×4.

As another embodiment, even in the case of 4×N/N×4 (N>=16), the 4×4 NSST may be applied.

Since both the 8×8 NSST and the 4×4 NSST follow a transformation combination configuration described in the present disclosure and are the non-separable transforms, the 8×8 NSST receives 64 data and outputs 64 data and the 4×4 NSST has 16 inputs and 16 outputs.

Both the 8×8 NSST and the 4×4 NSST are configured by a hierarchical combination of Givens rotations. A matrix corresponding to one Givens rotation is shown in Equation 1 below and a matrix product is shown in Equation 2 below.

$$R_\theta = \begin{bmatrix} \cos\theta & -\sin\theta \\ \sin\theta & \cos\theta \end{bmatrix} \quad \text{[Equation 1]}$$

$$t_m = x_m \cos\theta - x_n \sin\theta$$

$$t_n = x_m \sin\theta - x_n \cos\theta \quad \text{[Equation 2]}$$

As illustrated in FIG. 13 above, since one Givens rotation rotates two data, in order to process 64 data (for the 8×8 NSST) or 16 data (for the 4×4 NSST), a total of 32 or 8 Givens rotations are required.

Therefore, a bundle of 32 or 8 is used to form a Givens rotation layer. Output data for one Givens rotation layer is transferred as input data for a next Givens rotation layer through a determined permutation.

FIG. 14 illustrates one round configuration in 4×4 NSST constituted by a givens rotation layer and permutations as an embodiment to which the present disclosure is applied.

Referring to FIG. 14 above, it is illustrated that four Givens rotation layers are sequentially processed in the case of the 4×4 NSST. As illustrated in FIG. 14 above, the output data for one Givens rotation layer is transferred as the input data for the next Givens rotation layer through a determined permutation (i.e., shuffling).

As illustrated in FIG. 14 above, patterns to be permutated are regularly determined and in the case of the 4×4 NSST, four Givens rotation layers and the corresponding permutations are combined to form one round.

In the case of the 8×8 NSST, six Givens rotation layers and the corresponding permutations form one round. The 4×4 NSST goes through two rounds and the 8×8 NSST goes through four rounds. Different rounds use the same permutation pattern, but applied Givens rotation angles are different. Accordingly, angle data for all Givens rotations constituting each transform need to be stored.

As a last step, one permutation is further finally performed on the data output through the Givens rotation layers, and corresponding permutation information is stored separately for each transform. In forward NSST, the corresponding permutation is performed last and in inverse NSST, a corresponding inverse permutation is applied first on the contrary thereto.

In the case of the inverse NSST, the Givens rotation layers and the permutations applied to the forward NSST are performed in the reverse order and rotation is performed by taking a negative value even for an angle of each Givens rotation.

FIG. 15 is an embodiment to which the present disclosure is applied, and is a block diagram for describing operations of a forward reduced transform and an inverse reduced transform.

Reduced Secondary Transform (RST)

Assuming that an orthogonal matrix indicative of one transform has an N×N form, a reduced transform (hereinafter referred to as an "RT") leaves only R of N transform basis vectors (R<N). A matrix for a forward RT for generating a transform coefficient is given as in Equation 3 below.

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \quad \text{[Equation 3]}$$

A matrix for an inverse RT is a transpose matrix of the forward RT matrix. The application of the forward RT and the inverse RT is diagrammed like FIG. 15.

Assuming that an RT is applied to a top-left 8×8 block of a transform block that has experienced a primary transform, the RT may be named an 8×8 reduced secondary transform (8×8 RST).

Assuming that an R value in Equation 3 is 16, a forward 8×8 RST has a 16×64 matrix form, and an inverse 8×8 RST has a 64×16 matrix form.

Furthermore, the same transform set configuration as that in FIG. 12 may be applied to an 8×8 RST. That is, a corresponding 8×8 RST may be applied based on the transform set in FIG. 12.

As an embodiment, in FIG. 12, assuming that one transform set is composed of two or three transforms according to an intra prediction mode, one of a maximum of four transforms including a case where a secondary transform is not applied may be configured to be selected. In this case, the one transform may be considered as an identity matrix.

If indices 0, 1, 2, and 3 are assigned to four transforms, respectively, a corresponding transform may be designated by signaling a syntax element called an NSST index for each transform block. That is, in the case of an NSST, an 8×8 NSST may be designated with respect to an 8×8 top-left block based on an NSST index. In an RST configuration, the 8×8 RST may be designated. Furthermore, in this case, a No. 0 index may be assigned as an identity matrix, that is, a case where a secondary transform is not applied.

If a forward 8×8 RST, such as Equation 3, is applied, 16 valid transform coefficients are generated. Accordingly, it may be considered that 64 input data forming an 8×8 region is reduced to 16 output data. From a two-dimensional region viewpoint, only a region of ¼ is filled with valid transform coefficients. Accordingly, a 4×4 left-top region of FIG. 16 may be filled with 16 output data obtained by applying a forward 8×8 RST.

Meanwhile, the aforementioned RST may also be designated as a low frequency non-separable transform (LFNST).

FIG. 16 is an embodiment to which the present disclosure is applied, and is a diagram illustrating a process of performing an inverse scan from a 64-th to a 17-th according to an inverse scan order.

FIG. 16 illustrates that scanning is performed on a 17-th coefficient to a 64-th coefficient (in a forward scan order) assuming that the forward scan order starts from 1. However, FIG. 16 illustrates an inverse scan and illustrates that inverse scanning is performed on the 64-th to the 17-th.

Referring to FIG. 16, a top-left 4×4 region is a region of interest (ROI) to which a valid transform coefficient is assigned, and the remaining regions are empted. That is, a value 0 may be assigned to the remaining regions by default.

If a valid transform coefficient not 0 is present in a region other than the ROI region of FIG. 16, this means that an 8×8 RST is not applied. In this case, corresponding NSST index coding may be omitted.

In contrast, if a non-zero transform coefficient is not present in regions other than the ROI region of FIG. 16 (if the 8×8 RST is applied, 0 is assigned to the regions other than the ROI), an NSST index may be coded because there is a possibility that the 8×8 RST has been applied.

As described above, conditional NSST index coding may be performed after a residual coding process because it is necessary to check whether a non-zero transform coefficient is present.

According to an embodiment of the present disclosure, when the size of a transform block corresponds to 4×4, an NSST may be omitted. When the size of the transform block is greater than 4×4, the NSST may be applied to only a top-left 4×4 region.

FIG. 17 is an embodiment to which the present disclosure is applied, and illustrates three forward scan orders for a transform coefficient block.

Embodiment 1-1: RST to which 4×4 Block May be Applied

A non-separable transform to which one 4×4 block may be applied is a 16×16 transform. That is, if data elements forming a 4×4 block are lined up in a row-first or column-first order, a 16×1 vector may be formed, and a non-separable transform may be applied to the corresponding 16×1 vector.

A forward 16×16 transform is composed of 16 row direction transform basis vectors. If an inner product is applied to the 16×1 vector and each transform basis vector, a transform coefficient for the transform basis vector is obtained. A process of obtaining all corresponding transform coefficients for the 16 transform basis vectors is the same as that a 16×16 non-separable transform matrix and an input 16×1 vector are multiplied.

The transform coefficients obtained by the matrix multiplication have a 16×1 vector form, and may have a different statistical characteristic for each transform coefficient. For example, assuming that a 16×1 transform coefficient vector is composed of a No. 0 element to a No. 15 element, a dispersion of the No. 0 element may be greater than that of the No. 15 element. That is, an element that is located ahead may have a great energy value because it has a great disperse value.

If an inverse 16×16 non-separable transform is applied to a 16×1 transform coefficient, an original 4×4 block signal may be reconstructed. If a forward 16×16 non-separable transform is an orthonormal transform, a corresponding inverse 16×16 transform may be obtained through a transpose matrix for a forward 16×16 transform.

If an inverse 16×16 non-separable transform matrix is multiplied by a 16×1 transform coefficient vector, data having a 16×1 vector form is obtained and arranged in a row-first or column-first order that has been first applied, thereby being capable of obtaining a 4×4 block signal.

As described above, elements forming the 16×1 transform coefficient vector may have different statistical characteristics.

If transform coefficients located ahead (close to the No. 0 element) have greater energy, a signal much closer to an original signal can be reconstructed even if an inverse transform is applied to some transform coefficients that first emerge without using all the transform coefficients. For example, assuming that an inverse 16×16 non-separable transform is composed of 16 column basis vectors, a 16×L matrix may be configured by leaving only L column basis vectors. Furthermore, after important L transform coefficients are left (L×1 vector) among the transform coefficients, if the 16×L matrix and the L×1 vector are multiplied, a 16×1 vector not have a great error with the original input 16×1 vector data may be reconstructed.

As a result, since only the L coefficients are used for data reconstruction, an L×1 transform coefficient vector not a 16×1 transform coefficient vector has only to be calculated when a transform coefficient is obtained. That is, after an L×16 transform is configured by picking up L corresponding row direction transform vectors from a forward 16×16 non-separable transform matrix and is multiplied by a 16×1 input vector, the important L transform coefficients may be obtained.

The L value has a range of $1<=L<16$. In general, L vectors of 16 transform basis vectors may be selected using a given method. However, from a coding and decoding viewpoint, to select transform basis vectors having great importance in terms of energy of a signal may be advantageous from a coding efficiency viewpoint.

Embodiment 1-2: Configuration of Application Region of 4×4 RST and Deployment of Transform Coefficient A 4×4 RST may be applied as a secondary transform. In this case, the 4×4 RST may be two-dimensionally applied to a block a primary transform, such as DOT-2, has been applied. Assuming that the size of a block to which a primary transform has been applied is N×N, in general, the size of the block to which the primary transform has been applied is greater than 4×4. Accordingly, when the 4×4 RST is applied to an N×N block, the following two methods may be used.

As the first method, the 4×4 RST is not applied to the entire N×N region, but may be applied to some region. For example, the 4×4 RST may be applied to a top-left M×M region only ($M<=N$).

As the second method, after a region to which a secondary transform will be applied is divided into 4×4 blocks, the 4×4 RST may be applied to each of the divided blocks.

As an embodiment, the two methods may be mixed. For example, after only a top-left M×M region is divided into 4×4 blocks, a 4×4 RST may be applied to the divided M×M regions.

As an embodiment, a secondary transform may be applied to only a top-left 8×8 region. When an N×N block is equal to or greater than 8×8, an 8×8 RST may be applied to the top-left 8×8 region. When the N×N block is smaller than 8×8 (4×4, 8×4, 4×8), a top-left M×M region may be divided into 4×4 blocks as in the second embodiment, and a 4×4 RST may be applied to each of the 4×4 blocks. Furthermore, in the case of 4×N/N×4 ($N>=16$), the 4×4 RST may be applied.

After the 4×4 RST is applied, when L ($1<=L<16$) transform coefficients are generated, a degree of freedom for how the L transform coefficients will be deployed occurs. However, when the transform coefficients are processed in a residual coding step, a predetermined order will be present. Accordingly, coding performance may be different depending on how the L transform coefficients will be deployed in a two-dimensional block.

For example, in the case of HEVC residual coding, coding starts from a location farthest from a DC location. This is for increasing coding performance using the fact that a coefficient value that has experienced quantization is 0 or close to 0 as it becomes farther from the DC location.

Accordingly, it may be advantageous to deploy more important coefficients having higher energy than L transform coefficients so that they are coded later in order of residual coding in terms of coding performance.

FIG. 17 illustrates three forward scan orders of a 4×4 transform block (coefficient group (CG)) unit which is applied in HEVC. Residual coding follows an inverse order of the scan order in FIG. 17 (i.e., coding is performed in order of 16 to 1).

The three scan orders proposed in FIG. 17 are selected according to an intra prediction mode. Accordingly, the present disclosure may be configured to determine a scan order according to an intra prediction mode identically with respect to L transform coefficients.

Figure 18:
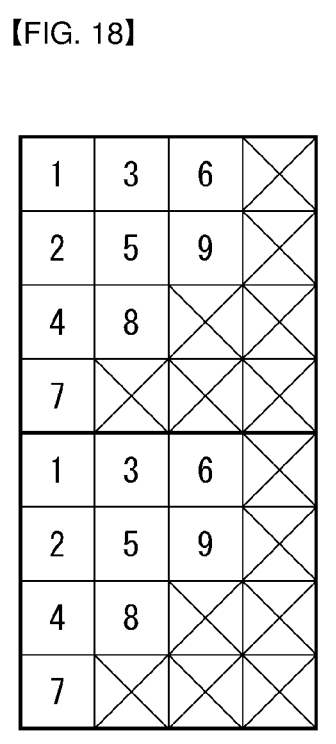

FIG. 18 is an embodiment to which the present disclosure is applied, and illustrates the locations of valid transform coefficients and a forward scan order for each 4×4 block when a diagonal scan is applied and a 4×4 RST is applied in a top-left 4×8 block.

If the diagonal scan order of FIG. 17 is followed, a top-left 4×8 block is divided into 4×4 blocks, and a 4×4 RST is applied to each of the 4×4 blocks, assuming that an L value is 8 (i.e., if only 8 of 16 transform coefficients are left), transform coefficients may be located like FIG. 18.

Only half of each 4×4 block may have transform coefficients, and a value 0 may be assigned to locations indicated as X by default.

Accordingly, residual coding may be applied assuming that L transform coefficients are disposed in each 4×4 block according to the scan order proposed in FIG. 17 and the remaining (16−L) locations of each 4×4 block are filled with 0.

FIG. 19 is an embodiment to which the present disclosure is applied, and illustrates a case where valid transform coefficients of two 4×4 blocks are merged into a single 4×4 block when a diagonal scan is applied and a 4×4 RST is applied in a top-left 4×8 block.

Referring to FIG. 19, L transform coefficients disposed in two 4×4 blocks may be merged into one. In particular, if an L value is 8, the transform coefficients of the two 4×4 blocks fully fill one 4×4 block and are merged. Accordingly, any transform coefficient is not left in another 4×4 block.

Accordingly, a corresponding coded_sub_block_flag can be coded as 0 because most of residual coding is unnecessary for the empted 4×4 blocks.

Furthermore, as an embodiment, various methods of mixing transform coefficients of two 4×4 blocks may be used. The transform coefficients may be merged according to a given order, but an embodiment of the present disclosure may provide the following methods.

1) Transform coefficients of two 4×4 blocks are alternately mixed in a scan order. That is, assuming that transform coefficients of an upper block in FIG. 18 are $c_0^u$, $c_1^u$, $c_2^u$, $c_3^u$, $c_4^u$, $c_5^u$, $c_6^u$, and $c_7^u$, and transform coefficient of a lower block are $c_0^l$, $c_1^l$, $c_2^l$, $c_3^l$, $c_4^l$, $c_5^l$, $c_6^l$, and $c_7^l$, the transform coefficients may be alternately mixed like $c_0^u$, $c_0^l$, $c_1^u$, $c_1^l$, $c_2^u$, $c_2^l$, ... $c_7^u$, and $c_7^l$, one by one. Alternatively, order of $c_\#^u$ and $c_\#^l$ may be changed. That is, $c_\#^l$ may be configured to first emerge.

2) Transform coefficients for the first 4×4 block may be first disposed, and transform coefficients for the second 4×4 block may be then disposed. That is, the transform coefficients may be connected and disposed like $c_0^u$, $c_1^u$, ..., $c_7^u$, $c_0^l$, $c_1^l$, ..., and $c_7^l$. Alternatively, order of the transform coefficients may be changed like $c_0^l$, $c_1^l$, ..., $c_7^l$, $c_0^u$, $c_1^u$, ..., and $c_7^u$.

Embodiment 1-3: Method of Coding NSST Index for 4×4 RST

If a 4×4 RST is applied as in FIG. 18, No. L+1 to No. 16 transform coefficients of each 4×4 block may be filled with a value 0 according to the scan order of the transform coefficients.

Accordingly, if a value not 0 occurs in the No. L+1 to the No. 16 locations of two 4×4 blocks, it can be seen that a 4×4 RST is not applied.

If the 4×4 RST has a structure in which one of a transform set prepared like the NSST is selected and applied, a transform index (may be named an NSST index in the present embodiment) indicating which transform will be applied may be signaled.

In one embodiment, it is assumed that the decoder 200 may be aware of an NSST index through bit stream parsing and bit stream parsing is performed after residual decoding.

If residual decoding is performed and it is checked that any one non-zero transform coefficient is present between No. L+1 to No. 16, an NSST index may be configured to be not parsed because a 4×4 RST is not applied.

Accordingly, the NSST index may be selectively parsed if necessary in order to reduce a signaling cost.

Assuming that the 4×4 RST is applied to a plurality of 4×4 blocks within a specific region as in FIG. 18 (e.g., the same 4×4 RST may be applied to all the plurality of 4×4 blocks and different 4×4 RST may be applied to all the plurality of 4×4 blocks), a 4×4 RST to which all the 4×4 blocks are applied may be designated through one NSST index. In this case, the same 4×4 RST may be designated, and a 4×4 RST to which each of all the 4×4 blocks is applied may be designated.

Since the 4×4 RST for all the 4×4 blocks and whether to apply the 4×4 RST are determined based on one NSST index, whether a non-zero transform coefficient is present in No. L+1 to No. 16 locations of all the 4×4 blocks may be checked during a residual decoding process. If, as a result of the check, a non-zero transform coefficient is present in a not-allowed location in one 4×4 block (from the No. L+1 to No. 16 locations), an NSST index may not be coded.

The NSST index may be separately signaled with each of a luminance block and a chrominance block. In the case of a chrominance block, a separate NSST index may be signaled with respect to Cb and Cr. One NSST index may be shared between a luminance block and a chrominance block.

If one NSST index is shared with respect to Cb and Cr, a 4×4 RST indicated by the same NSST index may be applied. In this case, the 4×4 RSTs for Cb and Cr may be the same, and may have the same NSST index, but an individual 4×4 RST may be used.

If the aforementioned conditional signaling is to be applied to the shared NSST index, whether a non-zero transform coefficient is present from No. L+1 to No. 16 may be checked with respect to all 4×4 blocks for Cb and Cr. If the non-zero transform coefficient is present, signaling for the NSST index may be not signaled.

As in FIG. 19, if transform coefficients for two 4×4 blocks are merged, when a 4×4 RST is applied, after whether a non-zero transform coefficient is present at a location where a valid transform coefficient is not present is checked, whether to signal an NSST index may be determined.

For example, as in FIG. 19b, when an L value is 8 and a 4×4 RST is applied, if valid transform coefficients for one 4×4 block (block indicated as X) are not present, coded_sub_block_flag of a block in which valid transform coefficients are not present may be checked. In this case, if the coded_sub_block_flag is 1, an NSST index may be not be signaled.

Embodiment 1-4: Optimization Method when Coding for NSST Index is Performed Prior to Residual Coding If coding for an NSST index is performed prior to residual coding, whether to apply a 4×4 RST is previously determined. Accordingly, residual coding may be omitted with respect to locations to which a transform coefficient is assigned as 0.

In this case, whether to apply the 4×4 RST may be configured to be aware through an NSST index. For example, when the NSST index is 0, the 4×4 RST is not applied.

Alternatively, whether to apply the 4×4 RST may be signaled through a separate syntax element (e.g., NSST flag). For example, if the separate syntax element is an NSST flag, the decoder 200 may check whether to apply the 4×4 RST by first parsing the NSST flag, and may omit residual coding for locations where a valid transform coefficient cannot be present when an NSST flag value is 1.

As an embodiment, the encoder 100 first codes the last non-zero transform coefficient location on a TU when performing residual coding. If coding for an NSST index is performed after the last non-zero transform coefficient coding, assuming the application of a 4×4 RST to a location of the last non-zero transform coefficient, if the location is determined as a location where a non-zero transform coefficient may not occur, the encoder 100 may configure the 4×4 RST to be not applied without coding the NSST index.

For example, in FIG. 18, in the case of locations indicated as X, valid transform coefficients are not located (e.g., a value 0, etc. may be filled) when a 4×4 RST is applied. Accordingly, if the last non-zero transform coefficient is located in a region indicated as X, the encoder 100 may omit coding for an NSST index. If the last non-zero transform coefficient is not located in the region indicated as X, coding for the NSST index may be performed.

As an embodiment, after coding for the last non-zero transform coefficient location, if whether to apply the 4×4 RST is checked by conditionally coding the NSST index, the remaining residual coding portion may be processed using the following two methods.

1) If the 4×4 RST is not applied, common residual coding is used without any change. That is, coding is performed assuming that any non-zero transform coefficient may be present in any location from the last non-zero transform coefficient location to a location corresponding to DC.

2) If the 4×4 RST is applied, a transform coefficient is not present in a specific location or a specific 4×4 block (e.g., in FIG. 18, an X location may be filled with 0 by default). Residual coding for a location or block where a transform coefficient is not present may not be performed.

For example, in FIG. 18, when a location indicated as X is reached, coding for sig_coeff_flag may be omitted. In this case, sig_coeff_flag is an example of a flag indicating whether a non-zero transform coefficient for a corresponding location is present.

As in FIG. 19, if transform coefficients of two blocks are merged into one block, coding for coded_sub_block_flag for a 4×4 block assigned as 0 may be omitted, and a corresponding value (coded_sub_block_flag) may be set to 0.

If an NSST index is coded after coding for the last non-zero transform coefficient location, when an x location ($P_x$) and y location ($P_y$) of the last non-zero transform coefficient are smaller than an x location ($T_x$) and y location ($T_y$) of a transform block, respectively, coding for the NSST index may be omitted, and a 4×4 RST may not be applied.

For example, when $T_x=1$, $T_y=1$, this means that an NSST index coding is omitted if the last non-zero transform coefficient is present at a DC location.

A method of determining whether to code the NSST index through a comparison with such a threshold value may be differently applied to each of a luminance and a chrominance. For example, $T_x$ and $T_y$ may be differently applied to a luminance and a chroma, a threshold value may be applied to a luminance and not be applied to a chroma, or vice versa.

The aforementioned two methods, that is, first, a method of omitting coding for an NSST index when the last non-zero transform coefficient is located in a region where a valid transform coefficient is not present and, second, a method of omitting coding for an NSST index when X coordinates and Y coordinates for the last non-zero transform coefficient is smaller than a threshold value, may be applied together.

For example, after a threshold value of a location coordinate of the last non-zero transform coefficient is first checked, whether the last non-zero transform coefficient is present in a region where a valid transform coefficient is not present may be checked, or order may be changed.

The methods proposed in the present embodiment 4 may also be applied to an 8×8 RST. That is, if the last non-zero transform coefficient is located in a region other than a top-left 4×4 within a top-left 8×8 region, coding for an NSST index may be omitted, and coding for an NSST index may be performed, if not.

Furthermore, if both X and Y coordinates values for the last non-zero transform coefficient location are less than a threshold value, coding for an NSST index may be omitted. Alternatively, the two methods may be applied together.

Embodiment 1-5: Different NSST Index Coding and Residual Coding Methods are Applied to Luminance Block and Chrominance Block when RST is Applied The methods described in Embodiment 1-3 and Embodiment 1-4 may be differently applied to a luminance and a chrominance. That is, coding for an NSST index and residual coding methods for a luminance and a chrominance may be differently applied.

For example, the method of Embodiment 1-4 may be applied to a luminance block, and the method of Embodiment 1-3 may be applied to a chrominance block. Alternatively, the conditional NSST index coding proposed in Embodiment 1-3 or Embodiment 1-4 may be applied to a luminance block, and conditional NSST index coding may not be applied to a chrominance block, or vice versa.

FIG. 20 is an embodiment to which the present disclosure is applied, and illustrates a flowchart in which a video signal is encoded based on a reduced secondary transform (RST).

The encoder 100 may determine (or select) a forward secondary transform based on at least one of a prediction mode, block shape and/or block size of a current block (S2010). In this case, a candidate for the forward secondary transform may include at least one of the embodiments of FIGS. 6 and/or 12.

The encoder 100 may determine an optimal forward secondary transform through rate-distortion (RD) optimization. The optimal forward secondary transform may correspond to one of a plurality of transform combinations. The plurality of transform combinations may be defined by a transform index. For example, for the RD optimization, the encoder 100 may compare the results of execution of all of a forward secondary transform, quantization, and residual coding for each of the candidates. In this case, an equation, such as cost=rate+λ·distortion or cost=distortion+λ·rate, may be used, but the present disclosure is not limited thereto.

The encoder 100 may signal a secondary transform index corresponding to the optimal forward secondary transform (S2020). In this case, other embodiments described in the present disclosure may be applied to the secondary transform index.

For example, the transform set configuration of FIG. 12 may be used for the secondary transform index. One transform set is composed of two or three transforms according to an intra prediction mode, and may be configured to select one of a maximum of four transforms including a case where the secondary transform is not applied. Assuming that indices 0, 1, 2, and 3 are assigned to four transforms, respectively, the encoder 100 may designate a transform to be applied by signaling a secondary transform index to each transform coefficient block. In this case, the encoder 100 may assign the No. 0 index as an identity matrix, that is, a case where the secondary transform is not applied.

As another embodiment, the signaling of the secondary transform index may be performed in any one step of 1) prior to residual coding, 2) in the middle of the residual coding (after the last non-zero transform coefficient coding), or 3) after the residual coding. The above embodiments are described in detail as follows.

1) A method of signaling a secondary transform index prior to residual coding

The encoder 100 may determine a forward secondary transform.

The encoder 100 may code a secondary transform index corresponding to the forward secondary transform.

The encoder 100 may code the location of the last non-zero transform coefficient.

The encoder 100 may perform residual coding on syntax elements other than the location of the last non-zero transform coefficient.

2) A method of signaling a secondary transform index in the middle of residual coding The encoder 100 may determine a forward secondary transform.

The encoder 100 may code the location of the last non-zero transform coefficient.

If the last non-zero transform coefficient is not located in a specific region, the encoder 100 may code a secondary transform index corresponding to a forward secondary transform. In this case, if a reduced secondary transform is applied, the specific region indicates the remaining regions other than a location wherein a non-zero transform coefficient may be present when transform coefficients are disposed according to a scan order. However, the present disclosure is not limited thereto.

The encoder 100 may perform residual coding on the syntax elements other than the location of the last non-zero transform coefficient.

3) A method of signaling a secondary transform index after residual coding

The encoder 100 may determine a forward secondary transform.

The encoder 100 may code the location of the last non-zero transform coefficient.

If the last non-zero transform coefficient is not located in a specific region, the encoder 100 may perform residual coding on syntax elements other than the location of the last non-zero transform coefficient. In this case, if a reduced secondary transform is applied, the specific region indicates the remaining regions other than a location where a non-zero transform coefficient may be present when transform coefficients are disposed according to a scan order. However, the present disclosure is not limited thereto.

The encoder 100 may code a secondary transform index corresponding to the forward secondary transform.

Meanwhile, the encoder 100 may perform a forward primary transform on the current block (residual block) (S2030). In this case, steps S2010 and/or S2020 may be similarly applied to the forward primary transform.

The encoder 100 may perform a forward secondary transform on the current block using an optimal forward secondary transform (S2040). For example, the optimal forward secondary transform may be a reduced secondary transform. The reduced secondary transform means that a transform by which L (L<N) transform coefficient data (L×1 transform coefficient vector) is output when N residual data (N×1 residual vector) is input.

As an embodiment, the reduced secondary transform may be applied to a specific region of the current block. For example, when the current block is N×N, the specific region may mean a top-left N/2×N/2 region. However, the present disclosure is not limited thereto, and be differently configured based on at least one of a prediction mode, a block shape, or a block size. For example, when the current block is N×N, the specific region may mean a top-left M×M region (M<=N).

Meanwhile, the encoder 100 may generate a transform coefficient block by performing quantization on the current block (S2050).

The encoder 100 may generate a bit stream by performing entropy encoding on the transform coefficient block.

FIG. 21 is an embodiment to which the present disclosure is applied, and illustrates a flowchart in which a video signal is decoded based on a reduced secondary transform (RST).

The decoder 200 may obtain a secondary transform index from a bit stream (S2110). In this case, other embodiments described in the present disclosure may be applied to the secondary transform index. For example, the secondary transform index may include at least one of the embodiments of FIGS. 6A, 6B and/or 12.

As another embodiment, the step of obtaining the secondary transform index may be performed in any one step of 1) before residual decoding, 2) in the middle of the residual decoding (after the decoding of the last non-zero transform coefficient), or 3) after the residual decoding.

The decoder 200 may derive a secondary transform corresponding to the secondary transform index (S2120). In this case, a candidate for the secondary transform may include at least one of the embodiments of FIGS. 6 and/or 12.

However, steps S2110 and S2120 are embodiments, and the present disclosure is not limited thereto. For example, the decoder 200 may derive the secondary transform based on at least one of a prediction mode, block shape and/or block size of a current block without obtaining the secondary transform index.

Meanwhile, the decoder 200 may obtain a transform coefficient block by entropy-decoding the bit stream, and may perform inverse quantization on the transform coefficient block (S2130).

The decoder 200 may perform an inverse secondary transform on the inverse-quantized transform coefficient block (S2140). For example, the inverse secondary transform may be a reduced secondary transform. The reduced secondary transform means a transform by which L (L<N) transform coefficient data (L×1 transform coefficient vector) is output when N residual data (N×1 residual vector) is input.

As an embodiment, the reduced secondary transform may be applied to a specific region of a current block. For example, when the current block is N×N, the specific region may mean a top-left N/2×N/2 region. However, the present disclosure is not limited thereto, the specific region may be differently configured based on at least one of prediction mode, a block shape, or a block size. For example, when the current block is N×N, the specific region may mean a top-left M×M region (M<=N) or M×L (M<=N, L<=N).

Furthermore, the decoder 200 may perform an inverse primary transform on the results of the inverse secondary transform (S2150).

The decoder 200 may generate a residual block through step S2150, and generates a reconstructed by adding the residual block and a prediction block.

A process of improving coding efficiency by applying an RST to a 4×4 block has been described through the aforementioned embodiments 1-1 to 1-5. In the following embodiments, a method and apparatus for reducing computational complexity by omitting a secondary transform for a transform block having a 4×4 size is described.

Embodiment 2-1: Non-Application of Secondary Transform to 4×4 Transform Block

FIG. 22 illustrates an example of a transform block and a top-left 4×4 region according to an embodiment of the present disclosure.

As illustrated in FIG. 22, a secondary transform may be configured to be applied to only a top-left 4×4 region of a transform block (transform unit or TU) having width×height (width>=4, height>=4).

In this case, if a non-separable transform is applied to the top-left 4×4 region as the secondary transform, a heavy computational load may occur compared to a case where a separable transform is applied. For example, if the non-separable transform is given as a 16×16 matrix, when the secondary transform is applied to the top-left 4×4 region, a total of 256 multiplications are necessary.

In the worse case, if one picture is divided into 4×4 transform blocks, when a secondary transform is applied to each of the 4×4 transform blocks (in the case of a secondary transform having a matrix form), 256 multiplications may be necessary. Accordingly, a great computational load is necessary compared to a primary transform. For example, if a separable transform is applied to a 4×4 transform block as a primary transform in a matrix multiplication form, a total of $2 \times 4^3 = 128$ multiplications are necessary. If a primary transform and a secondary transform are configured as respective pipeline steps and the primary transform and the secondary transform are performed in a pipelining form, a computational load for the secondary transform is much great. Accordingly, overall performance may be degraded because the secondary transform becomes a critical path in pipelining.

Accordingly, the secondary transform may be forced to be not applied to a case where the size of a transform block is 4×4. In other words, if the size of a transform block is 4×4, the secondary transform may be forced to be applied up to only a primary transform.

Embodiment 2-2: Selection of a Secondary Transform in Embodiment 2-1

In Embodiment 2-1, there is proposed a method of applying a secondary transform to only a top-left 4×4 region of a transform block. Examples of the secondary transforms which may be applied in the configuration of Embodiment 2-1 are as follows.

1) A reduced secondary transform (RST) which may be applied to a 4×4 region: a matrix of an L×16 (L<=16) form (corresponding to a forward transform).

2) A sparse orthonormal transform (SOT) or KLT which may be applied to a 4×4 region: it may be considered to correspond to the case of L=16 in 1), and may be considered as a transform having a 16×16 matrix form from a computational load viewpoint.

3) A JEM NSST which may be applied to a 4×4 region: this is a Givens rotation-based transform having 16 data inputs and 16 data outputs and has been described with reference to FIGS. 13 to 15.

4) A layered Givens transform (LGT) which may be applied to a 4×4 region: this is a Givens rotation-based transform having 16 data inputs and 16 data outputs as in 3), but is characterized in that a designated permutation is applied between two adjacent Givens rotation layers.

Basically, in addition to the aforementioned secondary transform, other types of secondary transforms may be applied.

Embodiment 2-3: Selection of a Primary Transform when a Transform Block is 4×4 in the Configuration of Embodiment 2-1

In the configuration of Embodiment 2-1, a secondary transform is not applied to a case where a transform block is 4×4. Accordingly, a primary transform may be configured to be applied to a case where a transform block is 4×4. In this case, the primary transform which may be applied is listed as follows.

1) As an MTS (EMT or AMT) combination to which JEM is applied, the transforms described with reference to FIGS. 6a and 6b are applied 2) DCT-2 is applied to both a horizontal transform and a vertical transform 3) DST-7 or DCT-8 may be applied in a horizontal direction, and DST-7 or DCT-8 may be applied in a vertical direction. Transform pairs may be composed of transform pairs which may be applied to residual samples generated through an intra prediction and a transform pair which may be applied to residual samples generated through an inter prediction, respectively, as in FIGS. 23a and 23b.

4) DST-7 is applied as both a horizontal transform and a vertical transform

FIG. 23 illustrates an example of a table for determining a transform type in a horizontal direction and a vertical direction according to a prediction mode, wherein FIG. 23a illustrates a transform pair to which a residual generated through an intra prediction is applied, and FIG. 23b illustrates a transform pair to which a residual generated through an inter prediction is applied.

Referring to FIG. 23a, if a transform is applied to a residual signal generated through an intra prediction or an inverse transform is applied to an inverse-quantized or inverse secondary-transformed signal, an index indicative of a transform type may be determined both in the horizontal direction and the vertical direction. For example, if an MTS index is 0, DST-7 is determined as a transform type for the horizontal direction and the vertical direction. When the MTS index is 1, DCT-8 is determined as a transform type for the horizontal direction, and DST-7 is determined as a transform type for the vertical direction. When the MTS index is 2, DST-7 is determined as a transform type for the horizontal direction, and DCT-8 is determined as a transform type for the vertical direction. When the MTS index is 3, DCT-8 is determined as a transform type for both the horizontal direction and the vertical direction.

Referring to FIG. 23b, if a transform is applied to a residual signal generated through an inter prediction or an inverse transform is applied to an inverse-quantized or inverse secondary-transformed signal, a transform type corresponding to an index indicative of a transform type may be determined in each of a horizontal direction and a vertical direction. For example, when an MTS index is 0, DCT-8 is determined as a transform type for both the horizontal direction and the vertical direction. When the MTS index is 1, DST-7 is determined as a transform type for the horizontal direction, and DCT-8 is determined as a transform type for the vertical direction. When the MTS index is 2, DCT-8 is determined as a transform type for the horizontal direction, and DST-7 is determined as a transform type for the vertical direction. When the MTS index is 3, DST-7 is determined as a transform type for both the horizontal direction and the vertical direction.

Embodiment 2-4: Application of the Secondary Transform of Embodiment 2-2 and the Primary Transform of Embodiment 2-3 in the Configuration of Embodiment 2-1

In the configuration of Embodiment 2-1, one of the secondary transforms proposed in Embodiment 2-2 may be applied to a top-left 4×4, and one of the primary transforms proposed in Embodiment 2-3 may be applied to a 4×4 transform block. A primary transform for a case where the size of a transform block is not 4×4 may be the same as or different from a primary transform applied to a 4×4 transform block. The tables illustrated in FIGS. 23a and 23b may be used for the JEM MTS illustrated in FIGS. 6a and 6b or a transform pair of the JEM MTS as a primary transform for a case where the size of a transform block is not 4×4.

FIG. 24 illustrates a flowchart of a method of encoding a video signal according to an embodiment of the present disclosure. FIG. 24 illustrates an example of an operation of the encoder 100 of FIG. 1.

At step S2410, the encoder 100 may check a transform block including residual samples after a prediction. The encoder 100 may derive prediction samples through a prediction for a current block. For example, the encoder 100 may determine whether to perform an inter prediction or whether to perform an intra prediction on the current block, and may determine a detailed prediction mode (detailed intra prediction mode or detailed intra prediction mode) based on a rate-distortion (RD) cost. The encoder 100 may derive the prediction samples for the current block based on the determined mode. Thereafter, the encoder 100 may derive the residual samples by comparing original samples in the current block with the prediction samples. For example, the encoder 100 may derive the residual samples by removing the prediction samples from the current block. Furthermore, the encoder 100 may check a transform block composed of the residual samples.

At step S2420, the encoder 100 may generate transform coefficients through a transform for the residual samples included in the transform block. More specifically, the encoder 100 may generate transform coefficients of a frequency domain by applying at least one transform to residual samples of a space domain included in the transform block. A detailed transform process according to an embodiment of the present disclosure is described in detail with reference to FIG. 25.

At step S2430, the encoder 100 may perform quantization and entropy coding on the transform coefficients. More specifically, the encoder 100 may generate an encoded video signal by performing quantization and entropy coding on the transform samples generated at step S2420. For example, the encoder 100 may encode image information, including information on the prediction and information on the residual samples, and may output the encoded image information in a bit stream form. In this case, the information on a prediction may include prediction mode information and motion information (if an inter prediction is applied) as information related to a prediction procedure. The information on the residual samples may include information on the quantized transform coefficients. An output bit stream may be delivered to the decoder 200 through a storage medium or over a network.

In other words, the encoder 100 may derive prediction samples through a prediction for a current block, may generate residual samples for the current block based on the prediction samples, may derive transform coefficients through a transform (primary transform/secondary transform) procedure, may derive quantized transform coefficients through quantization, and may encode image information including prediction information and residual information.

FIG. 25 illustrates an example of a transform process according to the size of a transform block in an encoding process of a video signal according to an embodiment of the present disclosure. FIG. 25 illustrates an example of step S2420 of FIG. 24.

At step S2510, the encoder 100 may perform a forward primary transform on a transform block including residual samples. More specifically, the encoder 100 may apply the forward primary transform to the transform block including the residual samples in each of a horizontal direction and a vertical direction. In this case, the forward primary transform may be denoted as a separable primary transform. According to an embodiment of the present disclosure, the forward primary transform may include a horizontal transform and a vertical transform. Furthermore, the forward primary transform may be determined by a combination of DCT-2, DST-7, or DCT-8. For example, the forward primary transform may be configured like FIGS. 6a and 6b, or FIGS. 24a and 24b.

At step S2520, the encoder 100 may determine whether the size of a transform block is smaller than or equal to 4×4. In this case, the size of the transform block may mean the number of samples included in the transform block. The size 4×4 of the transform block indicates that the number of samples in each of the horizontal direction and the vertical direction is four, and means that the number of horizontal direction (row direction) components is four and the number of vertical direction (column direction) components is four. In one embodiment, the transform block may be configured so that a horizontal direction (row direction) size and a vertical direction (column direction) size are the same. In this case, whether the transform horizontal direction size or vertical direction size is smaller than or equal to 4 may be checked. In another embodiment, the transform block may be configured so that the horizontal direction (row direction) size and the vertical direction (column direction) size are different. In this case, whether a total number of samples included in the transform block is smaller than or equal to 4×4=16 may be checked.

When the size of the transform block is smaller than or equal to 4×4, the encoder 100 may proceed to step S2530. At step S2530, the encoder 100 may omit a forward secondary transform. That is, when the size of the transform block is smaller than or equal to 4×4, the encoder 100 may perform quantization on transform coefficients in the state in which an additional transform has not been performed on transform coefficients generated by applying the forward primary transform.

When the size of the transform block is greater than 4×4, the encoder 100 may proceed to step S2540. At step S2540, the encoder 100 may apply a forward secondary transform. In other words, the encoder 100 may generate modified transform coefficients by additionally applying a secondary transform on the transform coefficients generated as the results of the forward primary transform. In this case, a non-separable secondary transform may be used as the forward secondary transform. According to an embodiment of the present disclosure, the forward secondary transform may be applied to a top-left 4×4 region of the transform block. In this case, the non-separable secondary transform may include at least one of a reduced secondary transform (RST) having a matrix of an L×16 form, wherein L is smaller than or equal to 16, a sparse orthonormal transform (SOT) having a matrix of a 16×16 form, a Givens rotation-based transform having 16 inputs and 16 outputs, or a layered givens transform having 16 inputs and 16 outputs and applying designated permutation between two neighboring Givens rotation layers.

FIG. 26 illustrates a flowchart of a process of decoding a video signal according to an embodiment of the present disclosure. FIG. 26 illustrates an example of an operation of the decoder 100 of FIG. 2.

At step S2610, the decoder 100 may generate a transform block including transform coefficients through entropy decoding and inverse quantization. The decoder 100 may generate the transform block composed of the transform coefficients, that is, a target of an inverse transform, through entropy decoding and inverse quantization for a bit stream of a video signal to be decoded.

At step S2620, the decoder 100 may generate residual samples through an inverse transform for the transform coefficients of the transform block. An inverse transform process according to an embodiment of the present disclosure is described in detail with reference to FIG. 27.

At step S2630, the decoder 100 may generate a reconstructed picture from the residual samples through a prediction. The decoder 100 may derive prediction samples by performing an inter prediction or an intra prediction on a current block based on prediction information. The decoder 100 may generate an original picture by merging the residual samples generated through the inverse transform process and the prediction samples generated through the prediction process.

FIG. 27 illustrates an example of a transform process according to the size of a transform block in a process of decoding a video signal according to an embodiment of the present disclosure.

At step S2710, the decoder 200 may determine whether the size of a transform block is smaller than or equal to 4×4. In this case, the size of the transform block may mean the number of transform coefficients included in the transform block. The size of the transform block 4×4 indicates that the number of samples in each of a horizontal direction and a vertical direction is four, and means that the number of horizontal direction (row direction) components is four and the number of vertical direction (column direction) components is four. In one embodiment, the transform block may be configured to be the same as a horizontal direction (row direction) size and a vertical direction (column direction) size. In this case, whether the transform horizontal direction size or the vertical direction size is smaller than or equal to 4 may be checked. In another embodiment, the transform block may be configured so that the horizontal direction (row direction) size and the vertical direction (column direction) size are different. In this case, whether a total number of coefficients included in the transform block is smaller than or equal to 4×4=16 may be checked.

When the size of the transform block is smaller than or equal to 4×4, the decoder 100 may proceed to step S2720. At step S2720, the decoder 200 may omit an inverse secondary transform. That is, when the size of the transform block is smaller than or equal to 4×4, the decoder 100 may proceed to step S2740 without an inverse secondary transform, may apply an inverse primary transform, and may perform a prediction on residual samples generated as the results of the inverse primary transform.

When the size of the transform block is greater than 4×4, the decoder 200 may proceed to step S2730. At step S2730, the decoder 200 may apply an inverse secondary transform. In this case, a non-separable secondary transform may be used as the inverse secondary transform. According to an embodiment of the present disclosure, the inverse secondary transform may be applied to a top-left 4×4 region of the transform block. In this case, the non-separable secondary transform may include at least one of a reduced secondary transform (RST) having a matrix of an L×16 form, wherein L is smaller than or equal to 16, a sparse orthonormal transform (SOT) having a matrix of a 16×16 form, a Givens rotation-based transform having 16 inputs and 16 outputs, or a layered givens transform having 16 inputs and 16 outputs and applying designated permutation between two neighboring Givens rotation layers. The decoder 200 may generate a transform block including modified transform coefficients as the results of the inverse secondary transform.

After the inverse secondary transform is omitted as in step S2720 or the inverse secondary transform is applied as in step S2730, the decoder 200 may proceed to step S2710. At step S2710, the decoder 200 may perform an inverse primary transform on the transform coefficients, generated by applying inverse quantization, or the transform block including modified transform coefficients generated by applying the inverse secondary transform. More specifically, the decoder 200 may apply an inverse primary transform to the transform block including transform coefficients in each of a horizontal direction and a vertical direction. In this case, the inverse primary transform may be denoted as a separable primary transform. According to an embodiment of the present disclosure, the inverse primary transform may include a horizontal transform and a vertical transform. Furthermore, the inverse primary transform may be determined based on DCT-2, DST-7, or DCT-8. For example, the inverse primary transform may be configured like FIGS. 6a and 6b or FIGS. 24a and 24b.

A secondary transform which may be applied to the present disclosure is not limited to the aforementioned transforms. Various types of non-separable secondary transforms which may be applied between the forward primary transform step and the quantization step based on the encoder and between the inverse quantization step and the inverse primary transform step based on the decoder may be applied to the present disclosure.

FIG. 28 illustrates an example of a video coding system as an embodiment to which the present disclosure is applied.

A video coding system may include a source device and a receiving device. The source device may transmit encoded video/image information or data to the receiving device via a digital storage medium or a network in a file or streaming form.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be implemented as a separate device or an external component.

The video source may acquire a video/image through a capturing, synthesizing, or generating process of the video/image. The video source may include a video/image capture device and/or a video/image generation device. The video/image capture device may include, for example, one or more cameras, video/image archives including previously captured video/images, and the like. The video/image generation device may include, for example, a computer, a tablet, and a smart phone and may (electronically) generate the video/image. For example, a virtual video/image may be generated by the computer, etc., and in this case, the video/image capturing process may be replaced by a process of generating related data.

The encoding apparatus may encode an input video/image. The encoding apparatus may perform a series of procedures including prediction, transform, quantization, and the like for compression and coding efficiency. The encoded data (encoded video/image information) may be output in the bitstream form.

The transmitter may transfer the encoded video/image information or data output in the bitstream to the receiver of the receiving device through the digital storage medium or network in the file or streaming form. The digital storage medium may include various storage media such as USB, SD, CD, DVD, Blu-ray, HDD, SSD, and the like. The transmitter may include an element for generating a media file through a predetermined file format and may include an element for transmission through a broadcast/communication network. The receiver may extract the bitstream and transfer the extracted bitstream to the decoding apparatus.

The decoding apparatus may perform a series of procedures including dequantization, inverse transform, prediction, etc., corresponding to an operation of the encoding apparatus to decode the video/image.

The renderer may render the decoded video/image. The rendered video/image may be displayed by the display.

FIG. 29 illustrates an example of a video streaming system as an embodiment to which the present disclosure is applied.

Referring to FIG. 29, the content streaming system to which the present disclosure is applied may basically include an encoding server, a streaming server, a web server, a media storage, a user equipment and a multimedia input device.

The encoding server basically functions to generate a bitstream by compressing content input from multimedia input devices, such as a smartphone, a camera or a camcorder, into digital data, and to transmit the bitstream to the streaming server. For another example, if multimedia input devices, such as a smartphone, a camera or a camcorder, directly generate a bitstream, the encoding server may be omitted.

The bitstream may be generated by an encoding method or bitstream generation method to which the present disclosure is applied. The streaming server may temporally store a bitstream in a process of transmitting or receiving the bitstream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bitstream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

The embodiments described in the present disclosure may be implemented and performed on a processor, a microprocessor, a controller, or a chip. For example, functional units illustrated in each drawing may be implemented and performed on a computer, the processor, the microprocessor, the controller, or the chip.

In addition, the decoder and the encoder to which the present disclosure may be included in a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VoD) service providing device, an OTT (Over the top) video device, an Internet streaming service providing devices, a three-dimensional (3D) video device, a video telephone video device, a transportation means terminal (e.g., a vehicle terminal, an airplane terminal, a ship terminal, etc.), and a medical video device, etc., and may be used to process a video signal or a data signal. For example, the OTT video device may include a game console, a Blu-ray player, an Internet access TV, a home theater system, a smartphone, a tablet PC, a digital video recorder (DVR), and the like.

In addition, a processing method to which the present disclosure is applied may be produced in the form of a program executed by the computer, and may be stored in a computer-readable recording medium. Multimedia data having a data structure according to the present disclosure may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bitstream generated by the encoding method may be stored in the computer-readable recording medium or transmitted through a wired/wireless communication network.

In addition, the embodiment of the present disclosure may be implemented as a computer program product by a program code, which may be performed on the computer by the embodiment of the present disclosure. The program code may be stored on a computer-readable carrier.

As described above, the embodiments described in the present disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the present disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the present disclosure is applied may be produced in the form of a program executed by a computer, and may be stored in a computer-readable recording medium. Multimedia data having a data structure according to the present disclosure may also be stored in a computer-readable recording medium. The computer-readable recording medium includes all types of storage devices in which computer-readable data is stored. The computer-readable recording medium may include a Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the present disclosure may be implemented as a computer program product using program code. The program code may be performed by a computer according to an embodiment of the present disclosure. The program code may be stored on a carrier readable by a computer.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute an embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

The aforementioned preferred embodiments of the present disclosure have been disclosed for illustrative purposes, and those skilled in the art may improve, change, substitute, or add various other embodiments without departing from the technical spirit and scope of the present disclosure disclosed in the attached claims.

The invention claimed is:

1. A method of encoding a video signal by an apparatus, comprising:
generating residual data except prediction data from an image of the video signal;
generating transform coefficients through a transform for the residual data; and
performing quantization and entropy coding for the transform coefficients,
wherein generating the transform coefficients includes:
performing a primary transform on the residual data to obtain transform coefficients;
deriving a secondary transform matrix to be applied to the transform coefficients;
performing a secondary transform on the transform coefficients based on the secondary transform matrix; and
generating a secondary transform index based on a non-zero transform coefficient not positioned in a specific region,
wherein the specific region represents a region other than a position where the non-zero transform coefficient exists when a reduced secondary transform is applied and transform coefficients are arranged according to a scan order, and
wherein the secondary transform index represents that one of 2 transform kernels in a transform set is used, and the transform set is determined based on an intra prediction mode.

2. The method of claim 1,
wherein the transform set for an intra prediction mode 52 is determined as the same transform set for an intra prediction mode 16.

3. The method of claim 1,
wherein the secondary transform matrix represents the reduced secondary transform outputting L second data (L×1 vectors) based on inputted N (N>L) first data (N×1 vectors).

4. The method of claim 1,
wherein the primary transform includes a horizontal transform and a vertical transform for the transform block, and
wherein each of the horizontal transform and the vertical transform is configured based on DCT-2 or a combination of DST-7 and DCT-8.

5. A method of decoding a video signal by an apparatus, comprising:
obtaining transform coefficients by performing entropy decoding and inverse quantization for a current block;
obtaining residual data through an inverse transform for the transform coefficients; and
reconstructing an image based on the residual data and prediction data,
wherein performing the inverse transform includes:
obtaining a secondary transform index based on a non-zero transform coefficient not positioned in a specific region,
wherein the specific region represents a region other than a position where the non-zero transform coefficient exists when a reduced secondary transform is applied and transform coefficients are arranged according to a scan order; and
performing an inverse secondary transform on the transform coefficients based on an inverse secondary transform matrix derived based on the secondary transform index; and
performing an inverse primary transform on the transform coefficients to which the inverse secondary transform is applied,
wherein the secondary transform index represents that one of 2 transform kernels in a transform set is used, and the transform set is determined based on an intra prediction mode.

6. The method of claim 5,
wherein the transform set for an intra prediction mode 52 is determined as the same transform set for an intra prediction mode 16.

7. The method of claim 5,
wherein the inverse primary transform includes a horizontal transform and a vertical transform for the transform block, and
wherein each of the horizontal transform and the vertical transform is configured as DCT-2 or a combination of DST-7 and DCT-8.

8. The method of claim 5,
wherein the inverse secondary transform corresponding to the reduced secondary transform represents a transform outputting N first data (N×1 vectors) based on inputted L (L<N) second data (L×1 vectors).

9. A non-transitory computer-readable medium storing video information generated by an encoding method, the encoding method comprising:
generating residual data except prediction data from an image of the video signal;
generating transform coefficients through a transform for the residual data; and
performing quantization and entropy coding for the transform coefficients,
wherein generating the transform coefficients includes:
performing a primary transform on the residual data to obtain transform coefficients;
deriving a secondary transform matrix to be applied to the transform coefficients;
performing a secondary transform on the transform coefficients based on the secondary transform matrix; and
generating a secondary transform index based on a non-zero transform coefficient not positioned in a specific region,
wherein the specific region represents a region other than a position where non-zero transform coefficient exists when a reduced secondary transform is applied and transform coefficients are arranged according to a scan order, and
wherein the secondary transform index represents that one of 2 transform kernels in a transform set is used, and the transform set is determined based on an intra prediction mode.

* * * * *

UNITED STATES PATENT AND TRADEMARK OFFICE
CERTIFICATE OF CORRECTION

| | |
|---|---|
| PATENT NO. | : 11,689,744 B2 |
| APPLICATION NO. | : 17/258973 |
| DATED | : June 27, 2023 |
| INVENTOR(S) | : Moommo Koo et al. |

It is certified that error appears in the above-identified patent and that said Letters Patent is hereby corrected as shown below:

In the Claims

Column 40, Line 50, of Claim 9, replace "a position where non-zero transform coefficient exists" with --a position where the non-zero transform coefficient exists--.

Signed and Sealed this
Nineteenth Day of September, 2023

Katherine Kelly Vidal
*Director of the United States Patent and Trademark Office*